United States Patent
Clark et al.

(10) Patent No.: US 10,389,762 B2
(45) Date of Patent: Aug. 20, 2019

(54) METHOD, SYSTEM AND APPARATUS FOR CAUSING A COMMUNICATION CLIENT TO JOIN A MEDIA-OVER-PACKET COMMUNICATION SESSION

(75) Inventors: David William Clark, Carp (CA); Jonathan Allan Arsenault, Orleans (CA); Jeffrey William Dawson, Stittsville (CA); Eric John Wolf, Stittsville (CA)

(73) Assignee: BCE INC., Montreal (CA)

( * ) Notice: Subject to any disclaimer, the term of this patent is extended or adjusted under 35 U.S.C. 154(b) by 1570 days.

(21) Appl. No.: 11/993,794

(22) PCT Filed: Dec. 19, 2006

(86) PCT No.: PCT/CA2006/002073
§ 371 (c)(1),
(2), (4) Date: May 7, 2010

(87) PCT Pub. No.: WO2008/074119
PCT Pub. Date: Jun. 26, 2008

(65) Prior Publication Data
US 2010/0217823 A1    Aug. 26, 2010

(51) Int. Cl.
*H04L 29/06*        (2006.01)
*H04M 1/253*        (2006.01)
(Continued)

(52) U.S. Cl.
CPC ...... *H04L 65/1069* (2013.01); *H04L 65/1093* (2013.01); *H04L 67/14* (2013.01);
(Continued)

(58) Field of Classification Search
CPC ........... H04L 29/06027; H04L 65/1069; H04L 65/1043; H04L 65/103; H04L 65/104;
(Continued)

(56) References Cited

U.S. PATENT DOCUMENTS

| 4,640,987 A | 2/1987 | Tsukada et al. |
| 5,754,636 A | 5/1998 | Bayless et al. |

(Continued)

FOREIGN PATENT DOCUMENTS

| EP | 1 558 004 A1 | 7/2005 |
| WO | 2005/101857 A1 | 10/2005 |
| WO | PCT/CA2006/002071 | 9/2007 |
| WO | PCT/CA2006/002073 | 10/2007 |

OTHER PUBLICATIONS

Written Opinion of the International Searching Authority dated Sep. 19, 2007 by the Canadian Intellectual Property Office in connection with International Patent Application Serial No. PCT/CA2006/002071, 5 pages.

(Continued)

*Primary Examiner* — Greg C Bengzon
(74) *Attorney, Agent, or Firm* — Gowling WLG (Canada) LLP

(57) ABSTRACT

Embodiments of the present invention are directed to a method, system and apparatus for causing a communication client to join a media-over-packet communication session. The method comprises receiving from a communication client an indication indicative of a desire of the communication client to establish a communication session, the communication client being registered in association with a user account. The method further comprises determining if there exists at least one active communication session established with at least one other communication client registered in association with the user account. Responsive to determining that there does exist at least one active communication session, the method further comprises causing the communication client to join at least one of the at least one active communication session.

25 Claims, 7 Drawing Sheets

(51) Int. Cl.
*H04M 1/723* (2006.01)
*H04L 29/08* (2006.01)

(52) U.S. Cl.
CPC ......... *H04M 1/2535* (2013.01); *H04M 1/723* (2013.01); *H04L 65/1006* (2013.01)

(58) Field of Classification Search
CPC . H04L 65/4007; H04L 12/1822; H04L 12/66; H04L 63/08; H04L 65/1093; H04L 65/1096; H04L 67/14; H04L 69/08; H04L 12/2854; H04L 12/5695; H04L 12/581; H04L 12/5895; H04L 12/6418; H04L 29/06; H04L 29/12122; H04L 29/12292; H04L 29/12377; H04L 29/125; H04L 47/724; H04L 47/801; H04L 47/805; H04L 47/806; H04L 51/04; H04L 51/38; H04L 61/1547; H04L 61/2069; H04L 61/2517; H04L 61/2564; H04L 63/00; H04M 7/006; H04M 3/42161; H04M 3/493; H04M 3/54; H04M 7/0075; H04M 1/2535; H04M 2203/2044; H04M 3/005; H04M 3/20; H04M 3/42059; H04M 3/42153; H04M 3/42272; H04M 3/543; H04M 3/56; H04M 7/003; H04M 15/00; H04M 15/06; H04M 15/08; H04M 15/83; H04M 15/835; H04M 15/8355; H04M 15/84; H04M 15/85; H04M 15/857; H04M 1/675; H04M 1/723; H04M 1/7253; H04M 2201/12; H04M 2203/5009; H04M 2203/5054; H04M 2203/551; H04M 2203/60; H04M 2203/6063; H04M 2242/22; H04M 2242/30; H04M 2250/14; H04M 3/2281; H04M 3/38; H04M 3/382; H04M 3/42; H04M 3/42042; H04M 3/42263; H04M 3/4281; H04M 3/4878; H04M 3/5175; H04Q 3/0025; H04Q 3/0029; H04Q 3/0045; H04Q 3/72; H04W 40/02; H04W 40/20; H04W 4/02; H04W 4/08; H04W 4/10; H04W 4/12; H04W 4/22; H04W 60/005; H04W 76/00; H04W 76/002; H04W 76/005; H04W 76/007; H04W 80/10; H04W 80/12; H04W 8/186; H04W 92/02; G06F 21/6218; G06F 2209/5016; G06Q 20/04; G06Q 20/305; G06Q 30/0267; H04N 7/152
See application file for complete search history.

(56) References Cited

U.S. PATENT DOCUMENTS

| | | | |
|---|---|---|---|
| 6,052,578 A | 4/2000 | McWeeny et al. | |
| 6,374,102 B1* | 4/2002 | Brachman | H04W 76/00 455/422.1 |
| 6,606,493 B1* | 8/2003 | Chow | H04M 3/42314 455/414.1 |
| 6,618,600 B1* | 9/2003 | Chow | H04W 76/00 379/373.02 |
| 6,711,401 B1* | 3/2004 | Chow | H04M 3/42314 455/414.1 |
| 6,804,224 B1* | 10/2004 | Schuster et al. | 370/352 |
| 6,961,559 B1* | 11/2005 | Chow | H04M 3/42314 455/414.1 |
| 7,016,667 B1* | 3/2006 | Chapman, Jr. | H04M 1/68 455/416 |
| 7,106,848 B1 | 9/2006 | Barlow et al. | |
| 7,120,139 B1 | 10/2006 | Kung et al. | |
| 7,334,017 B2* | 2/2008 | Hawkes | H04M 3/493 709/204 |
| 7,411,939 B1* | 8/2008 | Lamb | H04L 12/6418 370/352 |
| 7,516,410 B2 | 4/2009 | Thompson et al. | |
| 7,567,662 B1* | 7/2009 | Renner et al. | 379/202.01 |
| 7,583,197 B2* | 9/2009 | Wesby Van Swaay | H04M 1/05 340/573.4 |
| 7,826,832 B1 | 11/2010 | Ananthakrishnan | |
| 7,991,136 B2* | 8/2011 | Denny et al. | 379/202.01 |
| 8,014,497 B2* | 9/2011 | Brunson | H04L 29/06027 370/352 |
| 8,051,057 B2* | 11/2011 | Abu-Hakima | H04L 67/306 707/705 |
| 8,098,599 B2* | 1/2012 | Ho et al. | 370/260 |
| 8,166,173 B2* | 4/2012 | Low et al. | 709/227 |
| 8,223,944 B2* | 7/2012 | Cloran et al. | 379/202.01 |
| 8,462,772 B1* | 6/2013 | Robbins | H04L 65/1076 370/260 |
| 8,472,592 B1* | 6/2013 | Van Haaften et al. | 379/88.19 |
| 8,861,522 B2* | 10/2014 | Wang | H04L 29/12377 370/392 |
| 9,049,253 B2* | 6/2015 | Luck, Jr. | H04L 29/06027 |
| 9,253,148 B2* | 2/2016 | Zampiello | H04L 29/12367 |
| 10,237,401 B2* | 3/2019 | Dilkie | H04M 3/42221 |
| 2002/0055973 A1 | 5/2002 | Low et al. | |
| 2002/0196782 A1* | 12/2002 | Furukawa | H04Q 3/0025 370/352 |
| 2003/0058806 A1 | 3/2003 | Meyerson et al. | |
| 2003/0231639 A1 | 12/2003 | Mikkola | |
| 2005/0047389 A1 | 3/2005 | Bond et al. | |
| 2005/0048994 A1 | 3/2005 | Benco et al. | |
| 2005/0094621 A1* | 5/2005 | Acharya | H04L 29/06027 370/352 |
| 2005/0117737 A1* | 6/2005 | Stanford | H04M 1/2473 379/387.01 |
| 2005/0135333 A1 | 6/2005 | Rojas | |
| 2005/0170819 A1 | 8/2005 | Barclay et al. | |
| 2005/0198164 A1 | 9/2005 | Moore et al. | |
| 2005/0232253 A1* | 10/2005 | Ying | H04L 29/06027 370/356 |
| 2006/0070003 A1 | 3/2006 | Thompson et al. | |
| 2006/0072546 A1* | 4/2006 | Chen | H04L 29/06027 370/352 |
| 2006/0116127 A1* | 6/2006 | Wilhoite | H04M 3/42246 455/442 |
| 2006/0268752 A1* | 11/2006 | Ackermann-Markes | H04L 29/06027 370/260 |
| 2007/0064682 A1* | 3/2007 | Adams et al. | 370/352 |
| 2007/0086436 A1* | 4/2007 | Denny et al. | 370/352 |
| 2007/0115923 A1* | 5/2007 | Denny et al. | 370/352 |
| 2007/0115926 A1* | 5/2007 | Chahal et al. | 370/352 |
| 2007/0248077 A1* | 10/2007 | Mahle, Jr. | H04L 12/66 370/352 |
| 2007/0293220 A1* | 12/2007 | Mahler et al. | 455/435.1 |
| 2008/0021949 A1 | 1/2008 | John et al. | |
| 2008/0025291 A1* | 1/2008 | Barkley et al. | 370/352 |
| 2008/0037748 A1* | 2/2008 | Jefferson et al. | 379/202.01 |
| 2008/0065527 A1 | 3/2008 | Chieu et al. | |
| 2008/0154603 A1* | 6/2008 | Oddo | H04L 29/12594 704/251 |
| 2008/0175223 A1* | 7/2008 | Croak et al. | 370/352 |
| 2009/0279538 A1* | 11/2009 | Merino Gonzalez | H04L 29/06027 370/352 |
| 2010/0061365 A1* | 3/2010 | Farah | 370/352 |
| 2015/0208110 A1* | 7/2015 | Small | H04H 20/82 725/34 |
| 2016/0352666 A1* | 12/2016 | Katis | H04L 12/1831 |
| 2016/0352792 A1* | 12/2016 | Katis | G06Q 10/107 |

OTHER PUBLICATIONS

International Preliminary Report on Patentability completed on Jan. 30, 2009 by the Canadian Intellectual Property Office in connection

(56) References Cited

OTHER PUBLICATIONS with International Patent Application Serial No. PCT/CA2006/002071, 16 pages.

Office Action issued by the Canadian Intellectual Property Office dated Nov. 18, 2011 in connection with Canadian Patent Application Serial No. 2,612,924, 2 pages.

Panasonic, KX-TG5776S—Expandable Systems—Shop and Compare at Panasonic, downloaded on Oct. 23, 2007, 3 pages.

Nortel Networks, "Succession VoIP VPN Feature Guide—SN06.1", Copyright 2004, 48 pages.

Notice of Allowance and Fee(s) Due issued by the United States Patent and Trademark Office dated Oct. 24, 2012 in connection with U.S. Appl. No. 12/520,079, 10 pages.

Examiner's Report (i.e. Office Action) issued by the Canadian Intellectual Property Office dated Apr. 9, 2013 in connection with Canadian Patent Application Serial No. 2,612,924, 3 pages.

Examiner's Report dated Apr. 14, 2014 in connection with Canadian Patent Application 2,619,924, 2 pages.

\* cited by examiner

METHOD, SYSTEM AND APPARATUS FOR CAUSING A COMMUNICATION CLIENT TO JOIN A MEDIA-OVER-PACKET COMMUNICATION SESSION

FIELD OF THE INVENTION

This invention relates to the field of telecommunications in general and, more specifically, to a method, system and apparatus for causing a communication client to join a media-over-packet communication session.

BACKGROUND OF THE INVENTION

With the advent of the Internet, society has witnessed the expansion of a global packet-switched network into an ever-increasing number of homes and businesses. This has enabled an ever-increasing number of users to communicate with each other, primarily utilizing electronic communications, such as e-mail and instant messaging. Meanwhile, advances have been made in delivering voice communication over packet-switched networks, driven primarily by the cost advantage of placing long-distance calls over the packet-switched networks, but also by the ability to deliver advanced service features to users. This cost advantage can be enjoyed by both a service provider delivering the voice communication over the packet-switched network service (in a form of lower operating cost), as well as the user who subscribes to the services of such a service provider (in a form of lower service subscription fees). Technology dealing with the delivery of real-time voice communication over the packet-switched network is generally referred to as media-over-packet, voice-over-IP or, simply, VoIP.

As is well appreciated in the art, the delivery technology for VoIP is fundamentally different from the delivery technology for the traditional PSTN-based systems. Thus, certain features that are available to customers in the PSTN-based environment are not necessarily native to the VoIP environment. At the same time, customers may have become accustomed to having these features and may expect to have these features available to them in the VoIP environment, if they are to adopt VoIP-based communication as the primary means for establishing voice connections.

One example of a feature that is available in PSTN-based systems, but is not native to VoIP-based systems, pertains to the user experience when attempting to establish a communication session. Specifically, consider the scenario where a particular user has a single PSTN telephony line coming into the user's household with several telephones connected to the single telephony line. If a first member of the household is engaged in a voice conversation using one telephone and if a second member of the household picks up another telephone, the second member of the household will automatically join the voice conversation maintained by the first member of the household. However, this effect does not occur in VoIP-based systems, in which calls are established on a point-to-point basis. As a result, a VoIP version of this familiar feature is not presently available and, thus, VoIP providers may be less likely to attract customers away from the PSTN paradigm.

Therefore, it would be beneficial for VoIP service providers to be able to mimic this user experience in the VoIP environment.

SUMMARY OF THE INVENTION

According to a first broad aspect of the present invention, there is provided a method. The method comprises receiving from a communication client an indication indicative of a desire of the communication client to establish a communication session, the communication client being registered in association with a user account. The method further comprises determining if there exists at least one active communication session established with at least one other communication client registered in association with the user account. The method further comprises, responsive to determining that there does exist at least one active communication session, causing the communication client to join at least one of the at least one active communication session.

According to a second broad aspect of the present invention, there is provided an apparatus. The apparatus comprises means for receiving from a communication client an indication indicative of a desire of the communication client to establish a communication session, the communication client being registered in association with a user account. The apparatus further comprises means for determining if there exists at least one active communication session established with at least one other communication client registered in association with the user account. The apparatus further comprises means for causing the communication client to join the at least one of the at least one active communication session; the means for causing being responsive to a determination that there does exist at least one active communication session.

According to a third broad aspect of the present invention, there is provided a system. The system comprises a network element connectable to at least one communication client via a communication network, the network element being operable to receive from the at last one communication client an indication of a desire of the at least one communication client to establish a communication session via the communication network, the at least one communication client being registered in association with a user account. The network element is further operable to determine if there exists at least one active communication session established with at least one other communication client registered in association with the user account and, responsive to a positive determination that there does exist at least one active communication session, to cause the at least one communication client to join the at least one of the at least one active communication session.

According to a fourth broad aspect of the present invention, there is provided a media-over-packet communication client. The communication client is registerable with a network element in association with a user account. The communication client comprises a first functional entity for connecting to a data network adapted for handling media-over-packet calls and a second functional entity for receiving spoken utterances from a user to be conveyed via the first interface and for conveying to the user audio messages received via the first interface to the user. The media-over-packet communication client further comprises a third functional entity for allowing the user to convey a desire to join an active communication session that is in progress with another communication client registered with the network element in association with the user account.

According to another broad aspect of the present invention, there is provided a communication client. The communication client is registerable in association with a user account. The communication client comprises a first functional entity for connecting to a communication network adapted for handling voice communications and a second functional entity for receiving spoken utterances from a user to be conveyed via the first interface and for conveying to the user audio messages received via the first interface to the user. The communication client further comprises a third functional entity for allowing the user to selectively convey a desire to establish a new communication session or a desire to join an active communication session that is in progress with another communication client registered in association with the user account.

According to yet another broad aspect of the present invention, there is provided a computer readable medium. The computer-readable medium comprises computer-readable program code which, when executed by a computing apparatus, causes the computing apparatus:

to receive from the at last one communication client an indication of a desire of the at least one communication client to establish a communication session via the communication network, the at least one communication client being registered in association with a user account;

to determine if there exists at least one active communication session established with at least one other communication client registered in association with the user account;

responsive to a positive determination that there does exist at least one active communication session, to cause the at least one communication client to join the at least one of the at least one active communication session.

According to yet another broad aspect of the present invention, there is provided a method. The method comprises conveying, using a communication client, an indication of a user desire to join a communication session. The method further comprises receiving a communication session handling option of being able to handle the communication session by at least one of (i) establishing a new communication session and (ii) joining an active communication session that is in progress with another communication client registered in association with a user account associated with the communication client. The method further comprises, responsive to the receiving, conveying a disposition instruction indicative of whether the communication session should be handled by establishing the new communication session or by joining the active communication session.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
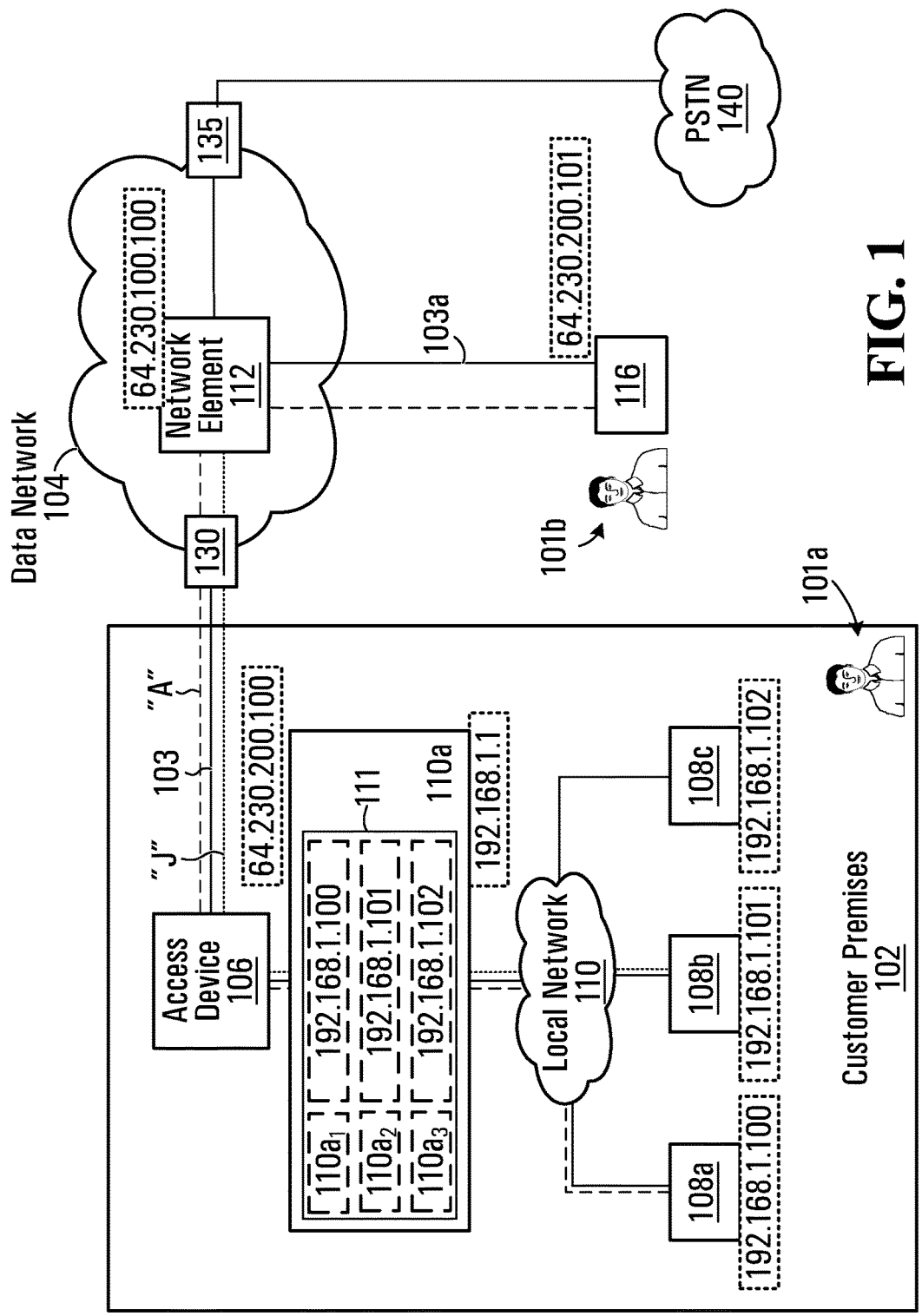
FIG. 1 is a diagram representing various components of a non-limiting embodiment of an infrastructure for causing a communication client to join a media-over-packet communication session.

FIG. 1 shows various components of an infrastructure that allows a communication client to join a media-over-packet communication session. The infrastructure comprises a customer premises 102 associated with a user 101*a*. Naturally, there may be other users (not depicted) located at the customer premises 102. The customer premises 102 may be coupled to a data network 104 via an access connection 103. The customer premises 102 may comprise, but is not limited to, a house, a unit in a multi-dwelling unit (MDU), an office, etc. The data network 104 may comprise any data network suitable for satisfying communication needs of user(s) at the customer premises 102 (such as, for example, the user 101*a*). These communication needs can include exchanging data, entertainment, telephony and the like. In a specific non-limiting embodiment of the present invention, the data network 104 can comprise the Internet. However, in alternative non-limiting embodiments of the present invention, the data network 104 may comprise another type of a public data network, a private data network, a wireless data network and the like.

In an example non-limiting embodiment of the present invention, the access connection 103 can be a copper twisted pair, over which higher-layer protocols allow for the exchange of packets (ex. an xDSL-based access link). In an alternative non-limiting embodiment, the access connection 103 may comprise an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, and the like), coaxial cable link, etc., or a combination thereof. Generally speaking, the access connection 103 may comprise any type of wireless, wired or optical connection that allows exchange of data between the customer premises 102 and the data network 104.

It should be noted that even though its depiction in FIG. 1 is greatly simplified, the data network 104 may comprise a number of network elements for facilitating exchange of data. For example, in the above-mentioned scenario where the access connection 103 is the xDSL-based link, the data network 104 may comprise a number of Digital Subscriber Line Access Multiplexers (DSLAMs), Outside Plant Interface DSLAMs (OPI-DSLAMs), edge routers, etc. In the above-mentioned scenario where the access connection 103 is a cable link, the data network 104 may comprise a number of cable headends, distribution hubs, etc. As a non-limiting example of these network elements, a DSLAM 130 has been depicted in FIG. 1. Persons skilled in the art will readily appreciate various possible configurations for the network elements that make up the data network 104 and, as such, these network elements need not be described here in great detail.

The customer premises 102 may comprise an access device 106 that facilitates exchange of data with the data network 104 via the access connection 103. In some embodiments of the present invention, the access device 106 may comprise a modem. Examples of modems that can be used include, but are not limited to, a cable modem, an xDSL modem and the like. In alternative embodiments of the present invention, which are particular applicable where the access connection 103 comprises Fiber-to-the-premise, the access device 106 may comprise an Optical Network Terminal (ONT). Naturally, the type of the access device 106 will depend on the type of the access connection 103 employed.

The customer premises 102 may comprise a number of communication clients coupled to the access device 106. Only three communication clients are depicted: a communication client 108a, a communication client 108b and a communication client 108c. Generally speaking, communication clients 108a, 108b and 108c can be implemented in hardware, software, firmware or a combination thereof. In a specific non-limiting example, the communication client 108a may comprise a VoIP phone, the communication client 108b may comprise a second VoIP phone and the communication client 108c may comprise a computing apparatus executing a soft client for handling VoIP calls. It should be understood that the customer premises 102 may comprise a number of additional communication clients that may include, but are not limited to, other VoIP phones, a wireless VoIP phone (such as, for example, a J2ME wireless phone), a Plain Old Telephone System (POTS) phone equipped with an Analog Terminal Adapter (ATA), other computing apparatuses executing soft clients, a set-top box, a gaming device, a security system and the like. The number of communication clients installed within the customer premises 102 is not limited other than by business considerations of a service provider who manages the access connection 103. Put another words, the customer premises 102 may comprise two or more communication clients similar to the communication clients 108a, 108b, 108c.

In some embodiments of the present invention, the communication clients 108a, 108b and 108c may be coupled directly to the access device 106. However, in the specific non-limiting embodiment depicted in FIG. 1, the communication clients 108a, 108b and 108c are coupled to the access device 106 via a local data network 110. In some non-limiting embodiments of the present invention, the local data network 110 may comprise a wired Ethernet-based network. In another non-limiting embodiment of the present invention, the local data network 110 may comprise a wireless network (ex. a Wi-Fi based network, a Wi-Max based network, BlueTooth® based network and the like). It should be noted that any other type of local data network 110 or a combination of the example networks can be used. In some of these embodiments, the local data network 110 may comprise a home gateway 110a that mediates communication between the communication clients 108a, 108b and 108c and the access device 106. The home gateway 110a may comprise a wireless router, a wired router or a combined wireless/wired router.

In some non-limiting embodiments of the present invention, the functionality of the access device 106 and the home gateway 110a may be embodied in a single device. In other non-limiting embodiments of the present invention, the functionality of the access device 106 and/or the home gateway 110a may be integrated into one of the communication clients 108a, 108b, 108c. In yet further alternative non-limiting embodiments of the present invention, the home gateway 110a and the local data network 110 can be omitted from the infrastructure of FIG. 1. This is particularly applicable in those non-limiting embodiments where the communication clients 108a, 108b or 108c are coupled to the access device 106 directly and, as such, the local data network 110 and the home gateway 110a can be omitted. Yet in other alternative non-limiting embodiments of the present invention, some of the communication clients 108a, 108b and 108c (as well as other communication clients potentially located within the customer premises 102, but omitted from the infrastructure of FIG. 1 for the sake of simplicity) may be coupled directly to the access device 106, while others of the communication clients 108a, 108b and 108c (as well as other communication clients potentially located within the customer premises 102, but omitted from the infrastructure of FIG. 1 for the sake of simplicity) may be coupled to the access device 106 via the local data network 110 and the home gateway 110a.

It should be understood that the infrastructure of FIG. 1 may comprise a number of additional communication clients outside the customer premises 102, coupled to the data network 104. As a non-limiting example only, the infrastructure of FIG. 1 may comprise a communication client 116 associated with another user (such as, for example, a user 101b). This communication client 116 may be coupled to the data network 104 via an access connection 103a. The communication client 116 may comprise one or more of a VoIP phone, a POTS phone equipped with an Analog Terminal Adapter (ATA), a computing apparatus executing a soft client, a set-top box, a gaming device, a security system and the like. The access connection 103a may be substantially similar to the access connection 103. However, it should be understood that the access connection 103 and the access connection 103a need not be of the same type in every embodiment of the present invention. For example, in some non-limiting embodiments of the present invention, the access connection 103 may comprise an xDSL-based link, while the access connection 103a may comprise a Fiber-to-the-Premise based link. Naturally, a myriad of other non-limiting combinations of how the access connections 103, 103a can be implemented are possible.

For the purposes of establishing communication sessions and terminating communication sessions between, for example, one of the communication clients 108a, 108b, 108c and another communication client (such as, for example, the communication client 116) via the data network 104, the data network 104 may comprise a network element 112. The network element 112 is sometimes referred to in the industry as a "soft switch" and comprises circuitry, software and/or control logic for providing various communication features to communication clients (such as, for example, the communication clients 108a, 108b, 108c and 116) coupled to the data network 104. Examples of such communication features include (i) connecting incoming calls to the communication clients (such as, for example, the communication clients 108a, 108b, 108c and 116); and (ii) handling outgoing calls originated from the communication clients (such as, for example, the communication clients 108a, 108b, 108c and 116). Other examples of communication features that can be performed by the network element 112 can include but are not limited to call waiting, call forking, and so on.

In some embodiments of the present invention, the network element 112 may further comprise circuitry, software and/or control logic for performing at least one of the following functions: synthesizing voice messages, providing audio mixing capabilities, receiving and interpreting speech utterances, detecting DTMF tones and the like. In an alternative non-limiting embodiment of the present invention, some or all of these additional functions may be performed by one or more other devices (not depicted) connected to and under control of the network element 112. Furthermore, among other functions performed by the network element 112, the network element 112 can maintain an active call table (not depicted) which logs all active communication sessions maintained by all communication clients registered to the network element 112 (such as, for example, the communication clients 108a, 108b, 108c and 116).

In addition, the network element 112 can comprise suitable circuitry, software and/or control logic for exchanging calls with entities outside the data network 104. This is particularly convenient, when a call is placed by the user of one of the communication clients that the network element 112 serves (i.e. a user 101a of one of the communication clients 108a, 108b, and 108c or the user 101b of the communication client 116) to a telephone number that is reachable only via the Public Switched Telephone Network (PSTN), which is depicted at 140 in FIG. 1 or via a wireless communication network (not depicted). In an alternative non-limiting embodiment of the present invention, the infrastructure of FIG. 1 may comprise a separate gateway 135 for mediating the communication flow between the data network 104 and the PSTN 140.

A non-limiting example of the network element 112 can be embodied in a MCS 5200 Soft Switch manufactured by Nortel Networks Ltd. of 8200 Dixie Road, Brampton, Ontario L6T 5P6, Canada. However, it should be expressly understood that the network element 112 can have various other configurations.

For the purposes of facilitating exchange of data via the data network 104, the home gateway 110a may be assigned a network address compatible with an addressing scheme of the data network 104. In some embodiments of the present invention, the network address can comprise an IPv4 address. In an alternative embodiment of the present invention, the network address can comprise an IPv6 address. In an alternative non-limiting embodiment of the present invention, the network address can comprise any other suitable type of a unique identifier, such as, for example, a media access control (MAC) address, a URL, a proprietary identifier and the like.

How the home gateway 110a is assigned the network address is not particularly limited. For example, in some non-limiting embodiments of the present invention, the home gateway 110a may be assigned a static network address. This static network address may be assigned to the home gateway 110a before the home gateway 110a is shipped to the customer premises 102, during an initial registration process or at another suitable time. In another non-limiting embodiment of the present invention, the home gateway 110a may be assigned a dynamic network address. For example, in a non-limiting scenario, a Dynamic Host Configuration Protocol (DHCP) server (not depicted) may be used to assign the dynamic network address (such as, for example, a dynamic IP address) to the home gateway 110a. In alternative non-limiting embodiments of the present invention, the home gateway 110a can obtain its network address by establishing a PPPoE session with a provisioning server (not depicted). Other alternative implementations are, of course, possible. In an alternative non-limiting embodiment of the present invention, which is particularly applicable in a scenario where the home gateway 110a is omitted, the access device 106 may be assigned a network address.

Each of the communication clients 108a, 108b and 108c is assigned a respective network address for the purposes of receiving and transmitting data via the home gateway 110a, the access device 106 and the data network 104. Several non-limiting embodiments as to how the network addresses of the communication clients 108a, 108b and 108c can be assigned are envisioned:

Public Network Addresses

In some embodiments of the present invention, the communication clients 108a, 108b and 108c can be assigned network addresses that are routable or, in other words, are visible to the data network 104 and other devices connected thereto (such as, for example, the network element 112 and/or the communication client 116). The routable network addresses are sometimes also referred to as "global" or "public" network addresses. For example, if the data network 104 implements an IPv6 address scheme, it is envisioned that each of the communication clients 108a, 108b and 108c may be assigned a unique public IP address. In some of these non-limiting embodiments, there may be no need for the local data network 110 and/or the home gateway 110a.

Private Network Addresses

In other embodiments of the present invention, each of the communication clients 108a, 108b and 108c can be assigned what is called a "local" or "private" network address. In these non-limiting embodiments, the private network addresses are used for the purposes of identifying the communication clients 108a, 108b and 108c within the local data network 110, while communication outside of the local data network 110 is implemented by using the aforementioned public network address assigned to the home gateway 110a (or, in some cases, the access device 106). In some non-limiting embodiments of the present invention, the home gateway 110a may be responsible for assigning private network addresses to the communication clients 108a, 108b and 108c. However, this need not be the case in every embodiment of the present invention. For example, the private network addresses can be assigned to the communication clients 108a, 108b and 108c by a dedicated address server (not depicted) coupled to the local data network 110.

In the specific non-limiting example depicted in FIG. 1, each of the communication clients 108a, 108b and 108c can be assigned a private network address by the home gateway 110a. For the sole purpose of simplifying the description to be presented herein below, it is assumed that both the private and the public network addresses are Internet Protocol (IP) addresses assigned according to the IPv4 protocol. However, it is expected that one of ordinary skilled in the art will easily adapt the teachings to be presented herein below to other addressing schemes.

Accordingly, the home gateway 110a may be assigned two IP addresses: a first IP address for the purposes of communicating with devices on the data network 104 (i.e. a so-called "network facing interface" IP address) and a second IP address for the purposes of communicating with devices on the local data network 110 (i.e. a so-called "premise facing interface" IP address). For example, the network facing interface IP address may comprise a public IP address "64.230.200.100". The assignment of this public IP address can be done by the aforementioned DHCP server (not depicted) coupled to the data network 104. The premise facing interface IP address may comprise a private IP address "192.168.1.1".

The home gateway 110a can be responsible for assigning private IP addresses to the communication clients 108a, 108b and 108c. For example, the communication client 108a may be assigned a private IP address "192.168.1.100", the communication client 108b may be assigned a private IP address "192.168.1.101" and the communication client 108c may be assigned a private IP address "192.168.1.102".

As one skilled in the art will appreciate, in the specific embodiment depicted in FIG. 1, the private IP addresses assigned to the communication clients 108a, 108b and 108c, as well as the private IP address assigned to the premise facing interface of the home gateway 110a, are only routable within the local data network 110, while the public IP address assigned to the network facing interface of the home gateway 110a is routable within the data network 104. Accordingly, in order to facilitate exchange of data between the communication clients 108a, 108b and 108c and the data network 104, the home gateway 110a can be operable to implement a Network Address Translation (NAT) operation or, in other words, to translate the private IP addresses assigned to the communication clients 108a, 108b and 108c for the purposes of routing data packets to/from the communication clients 108a, 108b and 108c using the public IP address assigned to the home gateway 110a.

NAT operation is known to those of skill in the art and, as such, no detailed description of the process will be presented here. However, for the benefit of the reader a brief overview will be presented. The home gateway 110a can be operable to receive a packet from one of the communication clients 108a, 108b and 108c (i.e. an outgoing packet). The home gateway 110a performs a NAT operation whereby a source address of the received outgoing packet (which in this non-limiting example can be the private IP address of one of the communication clients 108a, 108b and 108c that originated the outgoing packet) is substituted with the network facing interface IP address associated with the home gateway 110a and a port number that uniquely identifies one of the communication clients 108a, 108b, 108c which originated the outgoing packet. The home gateway 110a can further be operable to compile an internal mapping table 111. The internal mapping table 111 correlates at least (i) an original source address (i.e. the private IP address of one of the communication clients 108a, 108b, 108c that has originated the outgoing packet) to (ii) a port number assigned to the respective one of the communication clients 108a, 108b, 108c. In the specific non-limiting example of FIG. 1, the internal mapping table 111 correlates the private IP address of the communication client 108a (i.e. 192.168.1.100) to a port $110a_1$, the private IP address of the communication client 108b (i.e. 192.168.1.101) to a port $110a_2$, and the private IP address of the communication client 108c (i.e. 192.168.1.102) to a port $110a_3$. Data maintained within the internal mapping table 111 can allow the home gateway 110a to receive a packet destined for one of the communication clients 108a, 108b, 108c (i.e. an incoming packet addressed using the network facing interface IP address associated with the home gateway 110a and a port number associated with the one of the communication clients 108a, 108b, 108c to which the incoming packet is destined for) and using the internal mapping table 111, the home gateway 110a can route the incoming packet to the intended destination (i.e. one of the communication clients 108a, 108b, 108c). The home gateway 110a, thereby, allows for two-way exchange of packets between one or more of the communication clients 108a, 108b and 108c with any other device on the data network 104 (such as, for example, the communication client 116). It should be noted that in an alternative non-limiting embodiment of the present invention, the internal mapping table 111 can be maintained by another device accessible to the home gateway 110a.

In a similar manner, the communication client 116 may be associated with a network address. As a non-limiting example that is presented in FIG. 1, the communication client 116 can be directly coupled to the data network 104 without the use of a home gateway. This is particularly applicable in those embodiments, where the communication client 116 is embodied in a soft client executed on a computing apparatus, for example. In a non-limiting example, communication client 116 may be associated with an IP address "64.230.200.101", which may be a public IP address or, in other words, an IP address routable within the data network 104. For the purposes of a non-limiting illustration to be presented herein, it is assumed that the communication client 116 is coupled directly to the access connection 103a and, as such, exchange of data with the data network 104 can be performed without the need for any port number mapping.

For the purposes of exchanging data and, more specifically, for the purposes of establishing a communication session between two or more of the communication clients 108a, 108b, 108c and 116 (as well as potentially other communication clients), a registration process executed at the network element 112 can be implemented. For the sole purpose of simplifying the description to be presented herein below, an example of the communication session being a VoIP call will be used. However, it should be expressly understood that the type of communication sessions or the data exchanged between the communication clients 108a, 108b, 108c and 116 is not particularly limited and may include a video call, an instant messaging session or a multimedia session, to name just a few possibilities.

Figure 2:
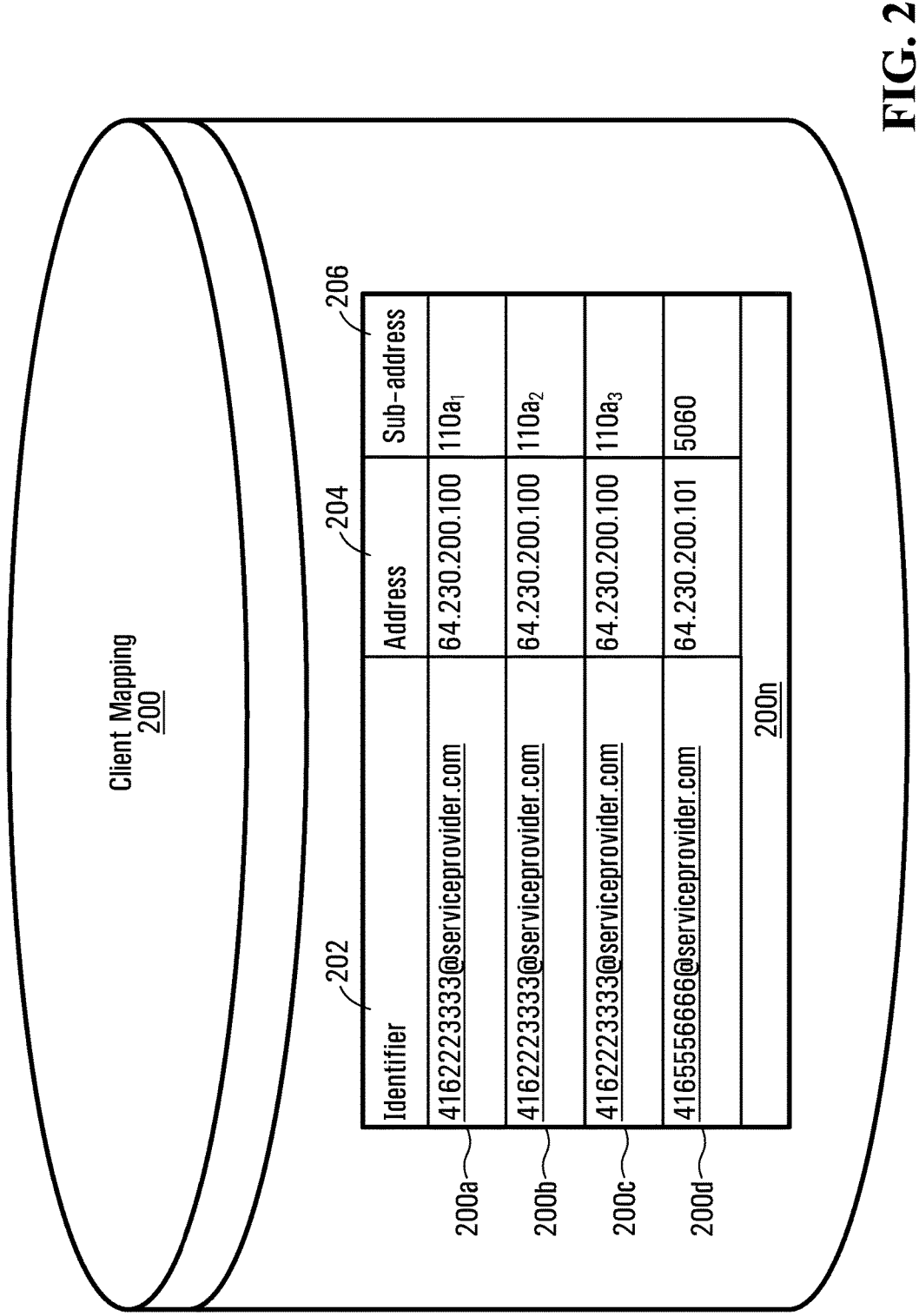
FIG. 2 is a diagram representing a non-limiting embodiment of a client mapping maintained by a network element of FIG. 1.

Before describing the registration process in detail, a client mapping 200 will now be described in greater detail with reference to FIG. 2. The client mapping 200 can be maintained by the network element 112 of FIG. 1 for the purposes of facilitating establishing of communication sessions between the communication clients 108a, 108b, 108c, 116 via the data network 104. The network element 112 can maintain the client mapping 200 in an internal database or in a separate database (not depicted) accessible to and under control of the network element 112.

The mapping 200 may maintain a plurality of records, such as records 200a, 200b, 200c and 200d. Each of the records 200a, 200b, 200c and 200d may maintain information about registered communication clients, such as for example, communication clients 108a, 108b, 108c and 116 respectively. Each of the records 200a, 200b, 200c and 200d may maintain a relationship between an identifier 202, an address 204 and a sub-address 206. In a specific non-limiting embodiment, the identifier 202 may comprise an alias or another identifier of a user (such as one of the users 101a, 101b) to which a particular communication client is registered to. Some non-limiting examples of the identifier 202 include, but are not limited to, a user account, a proprietary identifier, a network address and the like. In the specific non-limiting embodiment to be presented herein below, the identifier 202 comprises a Session Initiation Protocol (SIP) Universal Resource Identifier (URI) address assigned on a per user account basis or, in other words, all communication clients registered to the same user are associated with the same identifier 202. For the avoidance of doubt, it should be expressly understood that the user account can be associated with the user 101a, as well as other users residing at the customer premises 102.

The address 204 may comprise an indication of a public network address associated with an endpoint where the communication client is located (such as, for example, the customer premises 102). The sub-address 206 may contain an identifier that may be used to uniquely identify a particular communication client within its local data network should this be the case (such as, for example, within the local data network 110 of the customer premises 102). For example, in the non-limiting example to be presented herein below, the sub-address 206 may comprise an indication of a port number of the home gateway 110a within the local data network 110 associated with a particular communication client. In an alternative non-limiting embodiment of the present invention, the sub-address 206 may comprise another suitable identifier, such as, for example, a private IP address. In an alternative non-limiting embodiment of the present invention, the sub-address 206 may comprise a value which represents a value derived on the basis of the port number of the home gateway 110a. In yet further non-limiting embodiments of the present invention, the sub-address 206 may comprise an arbitrary value assigned by the home gateway 110a. In alternative embodiments of the present invention, which are particularly applicable where the communication clients 108a, 108b, 108c and 116 can be assigned a public network address, the sub-address 206 may comprise a default value or may be omitted. In the specific non-limiting example being presented herein, the communication client 116 may be associated with the public IP address and, as such, the sub-address 206 associated with the communication client 116 may be a default port value.

The data maintained in the identifier 202 is referred to sometimes herein below as a "user account identifier" and the data maintained in the address 204 and sub-address 206 is jointly referred to as a "communication client identifier". In some examples, as described above, the communication client identifier may only comprise the address 204.

The record 200a may be associated with the communication client 108a. As such, the identifier 202 of the record 200a may comprise an alias of the user 101a to whom the communication client 108a is registered or, in other words, who is the subscriber to communication services at the customer premises 102, such as, a SIP URI 4162223333@serviceprovider.com. It should be expressly understood that any other suitable form of the identifier 202 can be used, such as a numerical value, an alpha-numerical value, etc. The address 204 of the record 200a may comprise a public IP address associated with the home gateway 110a, which, in the specific non-limiting example being presented herein, is the public IP address "64.230.200.100". The sub-address 206 of the record 200a may comprise an indication of the port number of the home gateway 110a which is associated via the aforementioned internal mapping table 111 within the home gateway 110a with the communication client 108a or, in this non-limiting example, it may comprise "$110a_1$".

In a similar manner, the record 200b can be associated with the communication client 108b. Since in the non-limiting example being presented herein, the communication client 108b is associated with the same customer premises 102 as the communication client 108a, then for the purposes of the non-limiting example to be presented herein below, it is assumed that the communication client 108b is to be registered with the same user 101a. Accordingly, the identifier 202 of the record 200b can comprise an alias of the user 101a, which in the above example was SIP URI 4162223333@serviceprovider.com. It should be expressly understood that any other suitable form of the identifier 202 can be used, such as a numerical value, an alpha-numerical value, etc. The address 204 of the record 200b may comprise the public IP address associated with the home gateway 110a, which, in the specific non-limiting example being presented herein, is the public IP address "64.230.200.100". The sub-address 206 of the record 200b may comprise an indication of the port number of the home gateway 110a which is associated via the aforementioned internal mapping table 111 within the home gateway 110a with the communication client 108b or, in this non-limiting example, it may comprise "$110a_2$".

In a similar manner, the record 200c can be associated with the communication client 108c. Since in the non-limiting example being presented herein, the communication client 108c may be associated with the same customer premises 102 as the communication clients 108a, 108b, then for the purposes of the non-limiting example to be presented herein below, it is assumed that the communication client 108c is to be registered with the same user 101a as the communication clients 108a, 108b. Accordingly, the identifier 202 of the record 200c can comprise an alias of the user 101a, which in the above example was SIP URI 4162223333@serviceprovider.com. It should be expressly understood that any other suitable form of the identifier 202 of the record 200c can be used, such as a numerical value, an alpha-numerical value, etc. The address 204 of the record 200c may comprise the public IP address associated with the home gateway 110a, which, in the specific non-limiting example being presented herein, is the public IP address "64.230.200.100". The sub-address 206 of the record 200c may comprise an indication of the port number of the home gateway 110a which is associated via the aforementioned internal mapping table 111 within the home gateway 110a with the communication client 108c or, in this non-limiting example, it may comprise "$110a_3$".

The record 200d may be associated with the communication client 116. The identifier 202 of the record 200d may comprise an alias of the user 101b to whom the communication client 116 is registered to or, in other words, who is the subscriber to communication services at a location where the communication client 116 is located. In the present example, let the alias be a SIP URI 4165556666@serviceprovider.com. It should be expressly understood that any other suitable form of the identifier 202 of the record 200d can be used, such as a numerical value, an alpha-numerical value, etc. The address 204 of the record 200d may comprise the public IP address associated with the communication client 116, which, in the specific non-limiting example being presented herein, is the public IP address "64.230.200.101". The sub-address 206 of the record 200d may comprise an indication of the default port used for exchanging data between the communication client 116 and the data network 104 or, in this non-limiting example, it may comprise the default port number "5060". In alternative embodiments of the present invention, the sub-address 206 of the record 200c can be left blank. In further embodiments of the present invention, when the exchanging of data is implemented using the default port, the sub-address 206 of the record 200c can be omitted altogether.

The client mapping 200 may maintain a number of additional records, jointly depicted at 200n. These additional records 200n may be associated with other communication clients of the infrastructure of FIG. 1, which have been omitted for the sake of simplicity. How the client mapping 200 is generated is not particularly limited. In a specific non-limiting embodiment of the present invention, the client mapping 200 may be generated during a registration process of the communication clients 108a, 108b, 108c and 116 with the network element 112. Prior to describing the registration process, certain non-limiting assumptions will be made for the sole purpose of illustrating and providing an example for the description to be presented below.

Firstly, it is assumed that the communication clients 108a, 108b, 108c and 116 and the network element 112 implement a communication protocol for establishing and terminating communication sessions. In a specific non-limiting embodiment of the present invention, the communication protocol may comprise Session Initiation Protocol (SIP). In an alternative non-limiting embodiment of the present invention, the communication protocol may comprise Simple Object Access Protocol (SOAP) or it may comprise ITU-T's H.323 signalling protocol. It should be expressly understood that any suitable communication protocol may be used, whether standards-based or proprietary. Some examples of the proprietary protocols that can be used include, but are not limited to, Unified Stimulus (UNISTIM) protocol, Mitel Networks Telephony Application Inter (MiTAI) protocol, Skiny, etc.

Secondly, it is assumed that each of the communication clients 108a, 108b, 108c and 116 is aware of the location of the network element 112 or, in other words, a network address associated with the network element 112. In some embodiments of the present invention, the network element 112 may be associated with a static network address, such as, but not limited to, a static IP address "64.230.100.100". In these embodiments of the present invention, the communication clients 108a, 108b, 108c and 116 may be pre-programmed with the static IP address of the network element 112. In an alternative embodiment of the present invention, the network element 112 may be associated with a Uniform Resource Locator (URL), such as, for example, "http://www.soft-switch.serviceprovider.com". In these non-limiting embodiments of the present invention, the communication clients 108a, 108b, 108c and 116 may be pre-programmed with the URL of the network element 112. In yet further non-limiting embodiments of the present invention, the network element 112 may be associated with a dynamic network address, such as, for example, a dynamic IP address. In these non-limiting embodiments of the present invention, the communication clients 108a, 108b, 108c and 116 may discover the dynamic IP address of the network element 112 via an appropriate address discovery procedure, such as, for example, a Domain Name Service (DNS) look up. In some non-limiting embodiments of the present invention, the home gateway 110a or the access device 106 can be aware of the location of the network element 112 rather than the communication clients 108a, 108b, 108c. It should be noted that in alternative non-limiting embodiments of the present invention, the communication clients 108a, 108b, 108c may not be aware of the location of the network element 112. They may be, instead, be aware of the location of another network element (such as, for example, a Session Border Controller, a proxy server, etc.).

Figure 3:
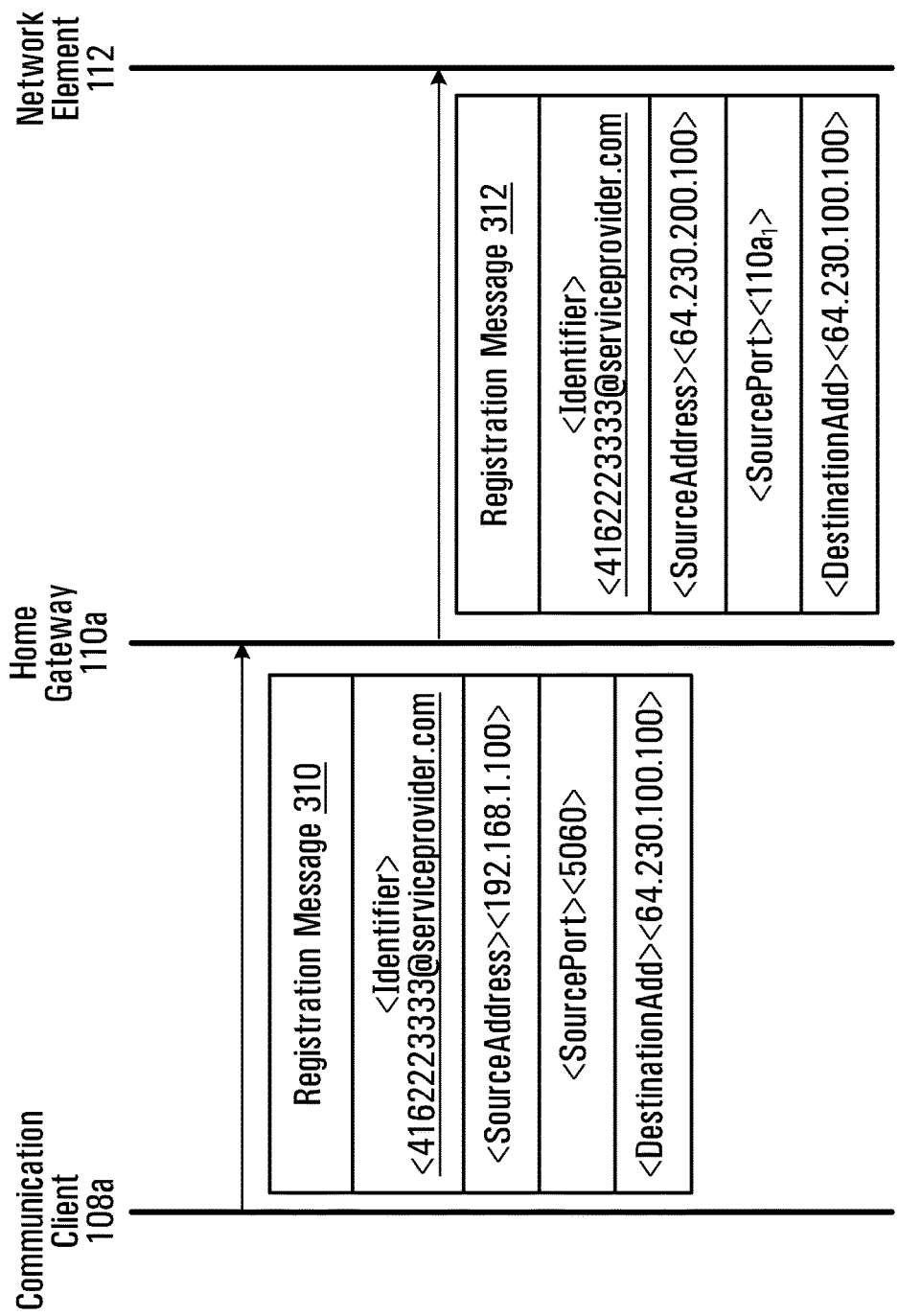
FIG. 3 is a signal flow diagram depicting a non-limiting embodiment of a flow of signals exchanged between a communication client and the network element of FIG. 1 during a registration process.

Having made these non-limiting assumptions, a registration process by virtue of which the communication clients 108a, 108b, 108c and 116 can register with the network element 112 will now be described in greater detail. With reference to FIG. 3, an example of how the communication client 108a can register with the network element 112 will now be described. In some non-limiting embodiments of the present invention, the communication client 108a may perform the registration process when the communication client 108a is powered on for the first time. In an alternative non-limiting embodiment of the present invention, the communication client 108a may perform the registration process after being unplugged and moved to a new location. In yet further non-limiting embodiments of the present invention, the communication client 108a can perform the registration process on-demand, for example, when triggered by the user 101a, by an application executed on the communication client 108a or by an application executed on another device in the customer premises 102 or connected to the data network 104. For example, each of the records 200a-200n may be assigned an "expiry" indicator. The expiry indicator can be set by the network element 112, it can be requested by the communication client submitting a registration request or it can comprise a default value (ex. 3600 seconds or the like). When the "expiry" indicator expires or shortly thereafter, the network element 112 may cause the respective communication client associated with the expired record 200a-200n to re-execute the registration process.

It should be noted that in alternative non-limiting embodiments of the present invention, a service provider who is responsible for managing the network element 112 can pre-provision the client mapping 200. Within these embodiments of the present invention, the registration process can be omitted. This scenario is particularly applicable in those non-limiting embodiments of the present invention, where the communication clients 108a, 108b, 108c, 116 or the home gateway 110a are assigned a static network address.

It should be noted that in some non-limiting embodiments of the present invention, each of the communication clients 108a, 108b, 108c and 116 may be aware of its respective identifier 202. How the communication clients 108a, 108b, 108c and 116 may become aware of their respective identifiers 202 is not particularly limited. In some embodiments of the present invention, an indication of the identifier 202 may be programmed into the communication clients 108a, 108b, 108c and 116 before they are dispatched to the respective users 101a, 101b. However, in alternative non-limiting embodiments of the present invention, the indication of the identifier 202 can be inputted by the respective user 101a, 101b during the registration process. In an alternative non-limiting embodiment of the present invention, the indication of the identifier 202 can be determined by the communication client 108a by interacting with the home gateway 110a or with the access device 106. For the purposes of the non-limiting example to be presented herein below, it is assumed that the user 101a has inputted the indication of the identifier 202 (i.e. 4162223333@serviceprovider.com) into the communication client 108a.

The communication client 108a generates a registration message 310. In some embodiments of the present invention, the registration message 310 comprises a packet comprising a SIP Registration message. In an alternative non-limiting embodiment, the registration message 310 comprises the SIP Registration message. The registration message 310 can comprise an indication of an identifier of the communication client 108a, such as the SIP URI 4162223333@serviceprovider.com (i.e. an "identifier"). The registration message 310 can further comprise an indication of a network address of the communication client 108a (ex. a so-called "source address"), which in this non-limiting example can comprise the private IP address of the communication client 108a (i.e. the private IP address 192.168.1.100) and an indication of a source port, which can be a TCP/UDP port value (ex. "5060"). The registration message 310 can further comprise an indication of the network address of the network element 112 (ex. the public IP address 64.230.100.100), i.e. a so-called "destination address". In an alternative non-limiting embodiment of the present invention, the destination address may be omitted from the registration message 310. Within these embodiments of the present invention, the destination address can be populated, for example, by the home gateway 110a as part of compiling a registration message 312 to be described below or by another entity. In further alternative non-limiting embodiments of the present invention, the identifier of the communication client 108a can be omitted from the registration message 310. Within these embodiments of the present invention, the identifier of the communication client 108a can be populated, for example, by the home gateway 110a as part of compiling a registration message 312 to be described below or by another entity. The communication client 108a then sends the registration message 310 towards the home gateway 110a via the local data network 110, using for example, SIP protocol.

The home gateway 110a receives the registration message 310 and compiles the registration message 312 by augmenting data received as part of the registration message 310. To that end, the home gateway 110a creates the registration message 312 by replacing the value in the received source address by its own public IP address, which in this non-limiting example can comprise the public IP address of the home gateway 110a (i.e. the public IP address "64.230.200.100"). The home gateway 110a further substitutes the value of the received source port with the source port number of the home gateway 110a associated with the communication client 108a (ex. "$110a_1$"). The home gateway 110a then sends the registration message 312 towards the network element 112 via the access device 106 and the data network 104.

When the network element 112 receives the registration message 312, it examines its content. It retrieves the identifier of the communication client 108a from the registration message 312 and generates the identifier 202 of the record 200a. It then retrieves the source address and populates the address 204. Using the data received as part of the source port, the network element 112 generates the sub-address 206. Accordingly, the network element 112 is operable to generate the aforementioned record 200a with the information received as part of the registration message 312. If the network element 112 determines that the record 200a associated with the communication client 108a already exists (i.e. an old record 200a), the network element 112 can delete the old record 200a and populate a new record 200a with the identifier 202, the address 204 and the sub-address 206 received as part of the registration message 312. Alternatively, the network element 112 can modify a portion of the old record 200a to derive the new record 200a.

In substantially the same manner, the communication clients 108b and 108c can generate and transmit registration messages similar to the registration messages 310 to enable the network element 112 to populate records 200b and 200c respectively. The communication client 116 can generate a registration message similar to the registration message 312 with a default port number as the sub-address 206 to enable the network element 112 to populate the record 200d.

It should be noted that in alternative non-limiting embodiments of the present invention, where the home gateway 110a is not SIP-aware, the home gateway 110a may perform NAT operation on an IP packet encapsulating the SIP registration request. Within these embodiments, the home gateway 110a amends information maintained within the IP packet encapsulating the SIP registration request and leaves the SIP registration request intact.

It should be understood that several components of the infrastructure of FIG. 1 can be omitted, configured differently or substituted by alternative components. A non-limiting example of one possible alternative of the infrastructure of FIG. 1 will now be described. In the specific non-limiting embodiment depicted in FIG. 1, the communication clients 108a, 108b and 108c are all registered to the same user 101a (i.e. all of the communication clients 108a, 108b and 108c are associated with the same identifier 202) and are all located at the customer premises 102. However, in an alternative non-limiting embodiment of the present invention, the communication clients 108a, 108b and 108c may be registered to the same user 101a (i.e. be associated with the same identifier 202), but may not be necessarily all located at the customer premises 102. For example, the communication client 108c may comprise a wireless VoIP phone and, as such, may not be physically located at the customer premises 102 all the time. As another example, the communication client 108b may be a VoIP phone located at a cottage (not depicted), but nevertheless may still be registered to the same user account associated with the user 101a. Accordingly, it should be understood that, broadly speaking, the communication clients 108a, 108b and 108c are associated with a communication endpoint associated with the user 101a not by virtue of being in the same location (ex. the customer premises 102), but rather by being registered to a single user account (ex. the user account associated with the user 101a). It should be further understood that within these non-limiting alternative embodiments, the various communication clients associated with the same user account will all have the same "user account information" (or another identifier) stored within identifier 202 of the client mapping 200, but may have different network addresses stored within the address 204 and sub-address 206.

Figure 4:
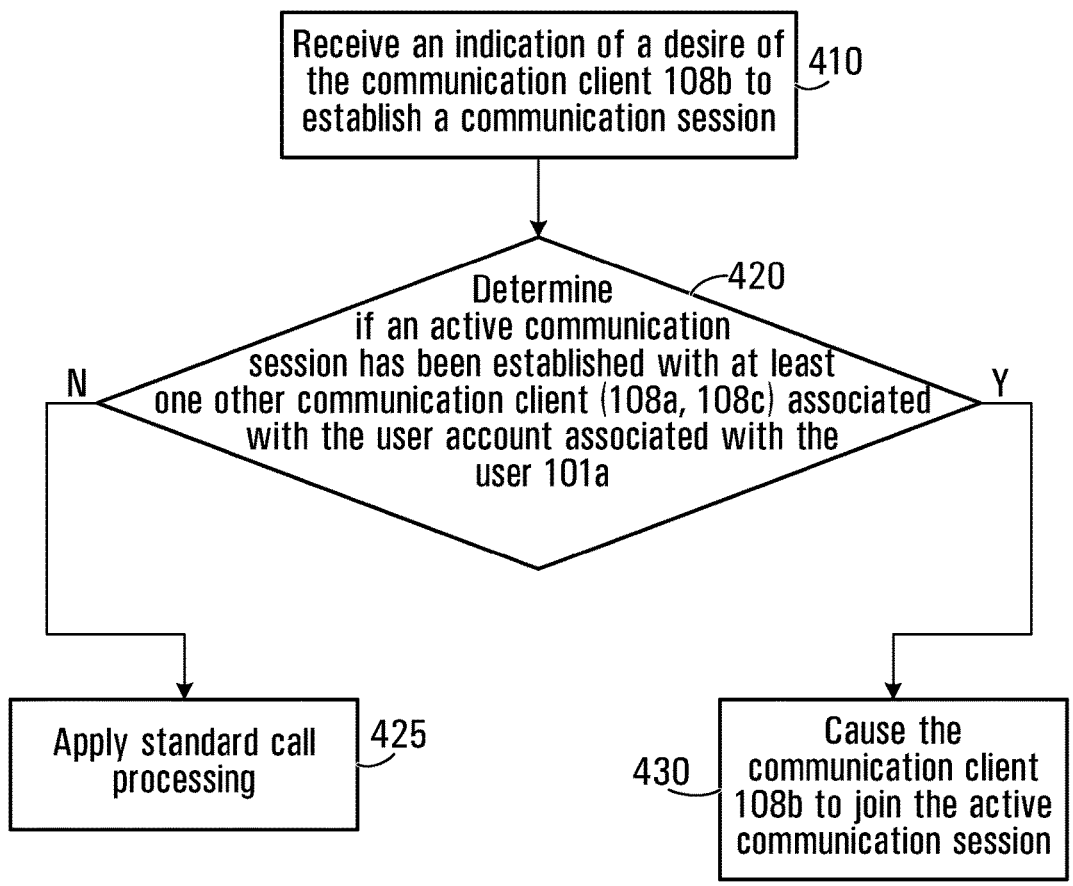
FIG. 4 is a flow chart representing a first non-limiting embodiment of a method for causing a communication client to join a communication session within the infrastructure of FIG. 1.

Given the infrastructure of FIG. 1, it is possible to execute a method for causing a communication client to join a media-over-packet communication session. With reference to FIG. 4, a first non-limiting embodiment of a method for causing a communication client to join a media-over-packet communication session will be described. For the purposes of the description to be presented herein below, it is assumed that the client mapping 200 of FIG. 2 has been populated with records 200a, 200b, 200c and 200d associated with the communication clients 108a, 108b, 108c and 116 respectively. An example non-limiting embodiment of the method will be described in the context of a non-limiting assumption that the user 101a using the communication client 108b is desirous of joining the active communication session (if such communications session exists).

Step 410

The method for causing a communication client to join the media-over-packet communication session begins at step 410, at which an indication of the desire of the communication client 108b to establish a communication session is received by the network element 112. In this first non-limiting embodiment of the present invention, the indication of the desire of the communication client 108b to establish the communication session may be assumed to signify that the user 101a at the communication client 108b is desirous of joining an active communication session (if such active communication session does exist).

Accordingly, the desire of the communication client 108b to join the active communication session may be implicit in actions of the user 101a at the communication client 108b. For example, it may be assumed that the user 101a is desirous of joining the aforementioned active communication session when the user 101a picks up a receiver of the communication client 108b, or otherwise causes the communication client 108b to enter an off-hook condition (such as, for example, by executing a soft client application, by clicking an "ON" button and the like).

Several non-limiting scenarios of how the network element 112 may become aware of the communication client 108b entering the off-hook condition and, therefore, may become aware of the desire of the communication client 108b to join the active communication session are possible.

According to a first non-limiting scenario, the communication client 108b may generate a SIP message, which is representative of the off-hook condition when the user 101a picks up the receiver of the communication client 108b or otherwise causes the communication client 108b to enter in the off-hook condition. To that end, the communication client 108b can generate the SIP message indicative of the off-hook condition and to transmit the SIP message indicative of the off-hook condition to the network element 112. In these non-limiting embodiments of the present invention, this SIP message indicative of the off-hook condition may indicate to the network element 112 that the user 101b is desirous of joining the active communication session.

In a second non-limiting scenario of the present invention, the communication client 108b may not be configured to automatically generate the SIP message indicative of the off-hook condition when the user 101a picks up the receiver of the communication client 108b or otherwise causes the communication client 108b to enter the off-hook condition. In these non-limiting embodiments, the communication client 108b may generate the SIP message indicative of the off-hook condition in response to an action by the user 101a. For example, the communication client 108b can generate the SIP message indicative of the off-hook condition in response to the user 101a clicking a dedicated button, a dedicated soft key, a pre-determined combination of keys (ex. "*9", etc.). As another non-limiting example, the communication client 108b can generate the SIP message indicative of the off-hook condition in response to the user 101a producing a speech utterance, such as, for example, "Phone off-hook", "Phone ON" and the like. In yet another example, the communication client 108b can generate the SIP message indicative of the off-hook condition in response to the user 101a clicking a button or a soft key on the communication client 108b which is designed for another function, such as, for example, a "SEND" button, an "OPTIONS" button and the like.

The communication client 108b can transmit the SIP message indicative of the off-hook condition in substantially the same manner as was described above in reference to the registration messages 310, 312 of FIG. 3. Similarly to the registration message 310, 312, the SIP message indicative of the off-hook condition comprises data for identifying the originator of the SIP message (i.e. the communication client 108b).

In alternative non-limiting embodiments of the present invention, where the network element 112 and the communication clients 108a, 108b, 108c implement a different communication protocol (such as, for example, SOAP, HTTP, TCP, UDP, etc.) another type of signalling message indicative of the off-hook condition can be used.

By virtue of receiving the SIP message indicative of the off-hook condition, the network element 112 proceeds to execution of step 420.

Step 420

At step 420, the network element 112 determines if an active communication session is in progress with at least one other communication client associated with the user 101a (i.e. with one of the communication clients 108a or 108c).

Firstly, the network element 112 determines a SIP URI associated with the communication client that has indicated the desire to establish the communication session at step 410. The SIP URI can be retrieved from the aforementioned SIP message received as part of step 410. Based on the SIP URI, the network element 112 accesses the aforementioned client mapping 200 and determines what other registered communication clients have the identifier 202 that matches the SIP URI of the communication client 108b. In the specific example being presented herein, the network element 112 determines that records 200a and 200c are associated with the same SIP URI as the communication client 108b or, put another way, are associated with the same user account associated with the user 101a.

The network element 112 then retrieves data maintained within the addresses 204 and the sub-addresses 202 of the records 200a, 200c (i.e. associated with the other communication clients 108a, 108c associated with the same user account associated with the user 101a). The network element 112 then accesses the aforementioned active call table (not depicted) to determine if any of the communication clients 108a, 108c associated are engaged in an active communication session, based on the data maintained within the addresses 204 and the sub-addresses 202 of the records 200a, 200c.

Step 425

If the network element 112 determines that none of the communication clients 108a, 108c is engaged in the active communication session (i.e. the "NO" branch of step 420), the network element 112 can apply standard call processing at step 425. For example, as part of the standard call processing, the network element 112 can cause the communication client 108b to emit a dial tone, the dial tone for indicating to the user 101a to dial a telephone number to establish a new communication session.

In an alternative non-limiting embodiment of the present invention, an error message can be presented to the user 101a. For example, the network element 112 can present an audio message, a text message or a combined audio/text message informing the user 101a that no active communication session exists. The audio, text or combination message may be presented to the user 101a via the communication client 108b or via another suitable device. Within these embodiments of the present invention, the network element 112 can further cause the communication client 108b to emit a dial tone, the dial tone for indicating to the user 101a to dial a telephone number to establish a new communication session.

Step 430

If, on the other hand, the network element 112 determines that the active communication session has been established and is in progress (i.e. the "YES" branch of step 420), the network element 112 executes step 430.

For the purposes of the description to be presented herein below, it is assumed that the communication client 108a is engaged in a voice telephony session with the communication client 116, depicted in a broken line "A" in FIG. 1 or, put another way, the broken line "A" depicts an active telephony session "A" between the communication client 108a and the communication client 116. Accordingly, in the specific non-limiting example being presented herein, the network element 112 determines that the communication client 108a associated with the address 204 and the sub-address 206 maintained in the record 200a is indeed engaged in the active communication session "A".

At step 430, the network element 112 causes the communication client 108b to join the active communication session "A". In a first non-limiting embodiment of the present invention, the network element 112 automatically causes the communication client 108b to join the active communication session "A" upon detection of the existence of the active communication session "A".

In an alternative non-limiting embodiment of the present invention, the network element 112 first announces via the active communication session "A" to a user of the communication client 108a which is the endpoint of the active communication session "A" that another user wishes to join the active communication session "A". In a first non-limiting example, the network element 112 may present an audible signal to the communication client 108a, such as, for example, a distinctive beep or a message. The message can take the form of, for example, a synthesized audible message: "Another caller is trying to join your communication session". In a second non-limiting example, the network element 112 may present a visual signal to the communication client 108a to be displayed on a display. This visual signal may take a myriad of forms and its main function is to advise the user of the communication client 108a that another user is trying to join the active communication session "A". Naturally, a combination of the audio and the visual notification can be presented.

In these non-limiting embodiments of the present invention, the network element 112 may further solicit, from the user of the communication client 108a, an indication of permission for the user 101a at the communication client 108b to join the active communication session "A". The indication of allowance may take a number of forms, such as for example, a spoken utterance "yes" or "no", a pre-determined sequence of keys indicative of "yes" or "no", clicking of a pre-determined key, button or link. Naturally, the indication of allowance may be provided by any other suitable means.

In an alternative non-limiting embodiment of the present invention, the network element 112 may announce that the user 101a is trying to join the active communication session "A" and to solicit from the user of the communication client 108a an indication of allowance for the user 101a to join the active communication session "A" by means other than via the active communication session "A". For example, the network element 112 may transmit an instant message to an instant message application executed on the communication client 108a or another device; send a short text message to a wireless device associated with the user of the communication client 108a, send an e-mail message and the like. In an alternative non-limiting embodiment of the present invention, an indication of allowance can be solicited from all parties involved in the active communication session "A", such as, for example, the users of the communication client 108a and the communication client 116.

How the network element 112 causes the communication client 108b to join the active communication session "A" is not particularly limited. In a specific non-limiting embodiment of the present invention, the network element 112 generates and transmits to the communication client 108b a signalling message (such, as for example, a SIP INVITE message), the signalling message for causing the communication client 108b to join the active communication session "A". More specifically, a communication session "J" can be established between the network element 112 and the communication client 108b. In the specific non-limiting embodiment depicted in FIG. 1, the communication session "J" can be joined with the active communication session "A" at the network element 112. In other words, mixing of media streams of the communication session "J" and the active communication session "A" can be performed by the network element 112. In alternative non-limiting embodiments of the present invention, mixing of the media streams can be performed in one of the communication clients 108a, 108b, 108c (in the example being presented herein, in one of the communication clients 108a, 108b). In alternative non-limiting embodiments of the present invention, the mixing could be performed at a dedicated device (not depicted) within or coupled to the data network 104.

In an alternative non-limiting embodiment of the present invention, the network element 112 may cause a multi-party call to be established between the communication client 108a, the communication client 108b and the communication client 116, thus causing the communication client 108b to join the active communication session "A" that has already been established between the communication client 108a and the communication client 116. In another non-limiting embodiment of the present invention, the network element 112 can establish a communication session between the communication client 108a and the communication client 108b and then bridge the so-established communication session with the active communication session "A". Other suitable means to cause the communication client 108b to join the active communication session "A" will become apparent to those of skill in the art.

In some embodiments of the present invention, the network element 112 can loop back to executing the step 410, where the network element 112 continues to monitor if another indication of the desire of the communication client 108c, for example, to establish a communication session is received.

Figure 5A:
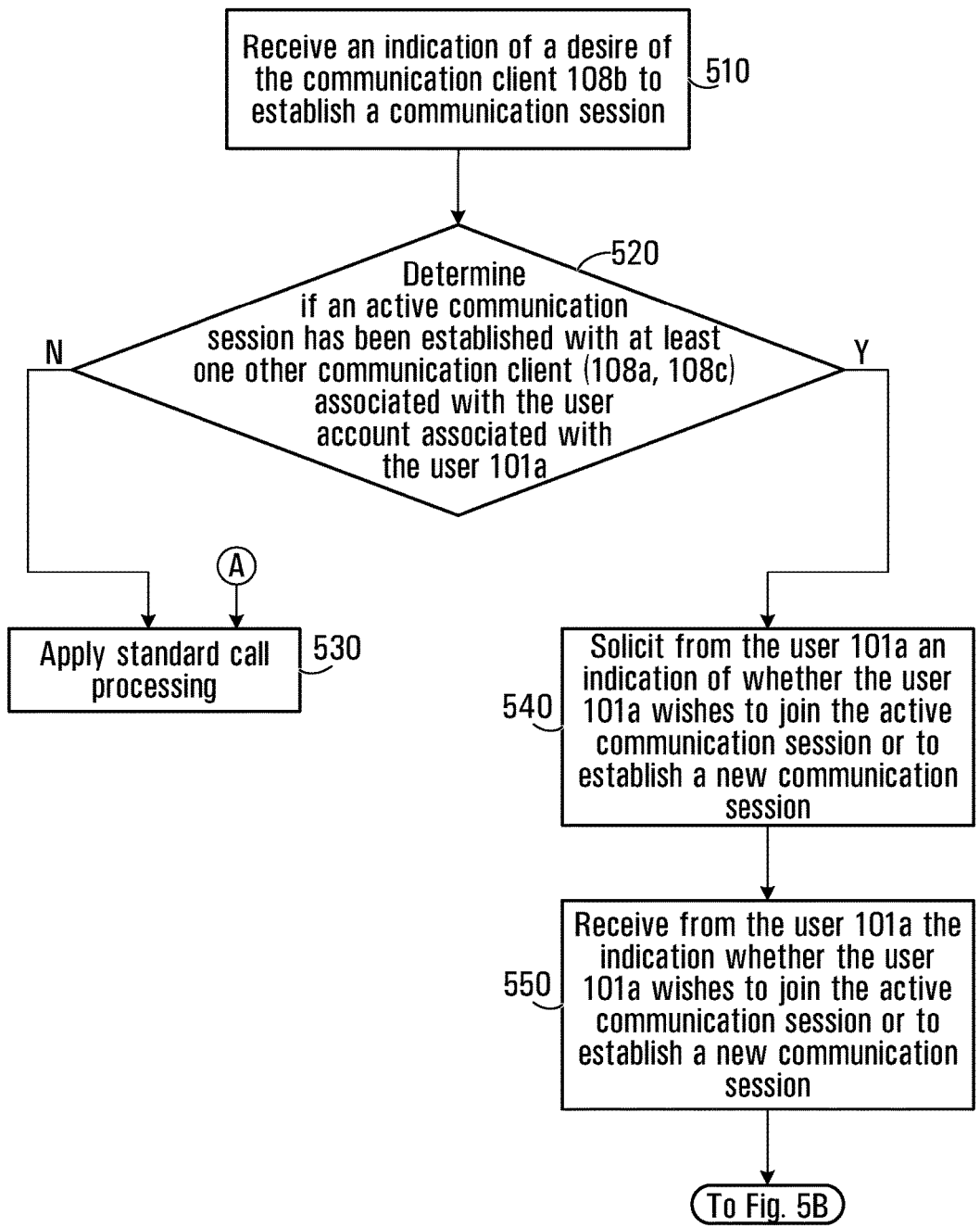
FIGS. 5A and 5B depict flow charts representing a second non-limiting embodiment of a method for causing a communication client to join a communication session within the infrastructure of FIG. 1.
Figure 5B:
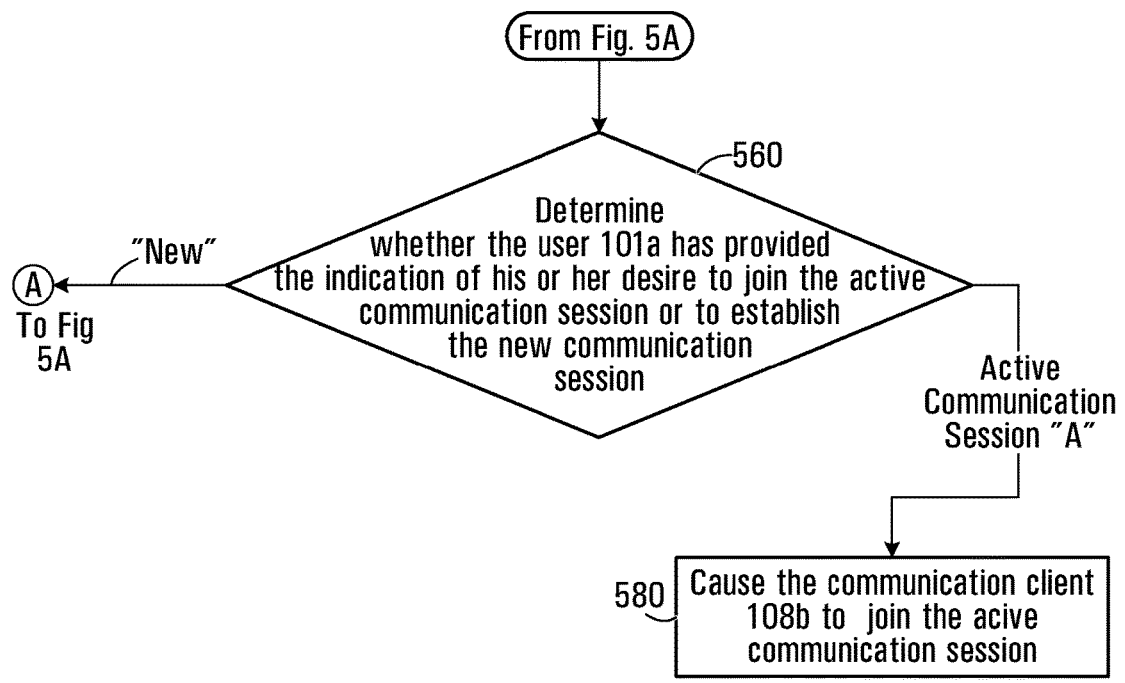

With reference to FIG. 5A and FIG. 5B a method for causing a communication client to join a media-over-packet communication session according to a second non-limiting embodiment of the present invention will now be described.

Step 510

The method for causing a communication client to join the media-over-packet communication session of FIG. 5A begins at step 510, at which the network element 112 receives from the communication client 108b an indication of the user's 101a desire to establish a communication session. In the specific non-limiting embodiment to be presented herein, the indication of the user's 101a desire to establish the communication session can be inherent in the user 101a causing the communication client 108b to enter an off-hook condition.

Several non-limiting scenarios of how the network element 112 may become aware of the communication client 108b entering the off-hook condition are possible.

According to a first non-limiting scenario, the communication client 108b may generate a SIP message, which is representative of the off-hook condition when the user 101a picks up the receiver of the communication client 108b or otherwise causes the communication client 108b to enter in the off-hook condition. To that end, the communication client 108b can generate the SIP message indicative of the off-hook condition and to transmit the SIP message indicative of the off-hook condition to the network element 112. In these non-limiting embodiments of the present invention, this SIP message indicative of the off-hook condition may indicate to the network element 112 that the user 101b is desirous of joining the active communication session "A".

In a second non-limiting scenario of the present invention, the communication client 108b may not be configured to automatically generate the SIP message indicative of the off-hook condition when the user 101a picks up the receiver of the communication client 108b or otherwise causes the communication client 108b to enter the off-hook condition. In these non-limiting embodiments, the communication client 108b may generate the SIP message indicative of the off-hook condition in response to an action by the user 101a. For example, the communication client 108b can generate the SIP message indicative of the off-hook condition in response to the user 101a clicking a dedicated button, a dedicated soft key, a pre-determined combination of keys (ex. "*9", etc.). In yet another example, the communication client 108b can generate the SIP message indicative of the off-hook condition in response to the user 101a clicking a button or a soft key on the communication client 108b which is designed for another function, such as, for example, a "SEND" button, an "OPTIONS" button and the like.

The communication client 108b can transmit the SIP message indicative of the off-hook condition in substantially the same manner as was described above in reference to the registration messages 310, 312 of FIG. 3. Similarly to the registration message 310, 312, the SIP message indicative of the off-hook condition comprises data for identifying the originator of the SIP message (i.e. the communication client 108b).

Step 520

At step 520, the network element 112 determines if an active communication session is in progress with at least one other communication client associated with the user 101a (i.e. with one of the communication clients 108a or 108c). In other words, the network element 112 determines if another user located at the customer premises 102 is engaged in a communication session using one of the communication clients 108a, 108c.

Firstly, the network element 112 determines a SIP URI associated with the communication client that has indicated the desire to establish the communication session at step 510. The SIP URI can be retrieved from the aforementioned SIP message received as part of step 510. Based on the SIP URI, the network element 112 accesses the aforementioned client mapping 200 and determines what other registered communication clients have the identifier 202 that matches the SIP URI of the communication client 108b. In the specific example being presented herein, the network element 112 determines that records 200a and 200c are associated with the same SIP URI as the communication client 108b or, put another way, are associated with the same user account associated with the user 101a.

The network element 112 then retrieves data maintained within the addresses 204 and the sub-addresses 202 of the records 200a, 200c (i.e. associated with the other communication clients 108a, 108c associated with the same user account associated with the user 101a). The network element 112 then accesses the aforementioned active call table (not depicted) to determine if any of the communication clients 108a, 108c associated are engaged in an active communication session, based on the data maintained within the addresses 204 and the sub-addresses 202 of the records 200a, 200c.

Step 530

If the network element 112 determines that none of the communication clients 108a, 108c is engaged in the active communication session (i.e. the "NO" branch of step 520), the network element 112 may execute standard call processing at step 530 by, for example, causing the communication client 108b to emit a dial tone.

Step 540

If, on the other hand, the network element 112 determines that the active communication session is in progress (i.e. the "YES" branch of step 520), the network element 112 may solicit at step 540 an indication from the user 101a of whether the user 101a is desirous of either (a) joining the active communication session; or (b) establishing a new communication session.

For the purposes of the description to be presented herein below, it is assumed that the communication client 108a is engaged in a voice telephony session with the communication client 116, depicted in the broken line "A" in FIG. 1 or, put another way, the broken line "A" depicts an active telephony session "A" between the communication client 108a and the communication client 116. Several non-limiting scenarios how the user 101a may provide the indication of whether the user 101a wishes to join the active communication session "A" or to establish the new communication session are envisioned.

In a first non-limiting scenario, responsive to determining that the active communication session "A" has been established and in progress, the network element 112 may cause the communication client 108b to solicit from the user 101a the indication of whether the user 101a wishes to join the active communication session "A" or to establish the new communication session. For example, the network element 112 may transmit a trigger to the communication client 108b to cause the communication client 108b to present the user 101a two options, such as, for example, two soft keys: "JOIN" and "NEW SESSION". In an alternative embodiment of the present invention, the communication client 108b may present the user 101a with two links representative of the two options.

In another non-limiting scenario, the network element 112 may generate a voice message soliciting from the user 101a the indication of whether the user 101a wishes to establish a new communication session or to join the active communication session "A". In yet another non-limiting embodiment of the present invention, the network element 112 may transmit a trigger to the communication client 108b, the trigger for causing the communication client 108b to generate a voice message soliciting from the user 101a the indication of whether the user 101a wishes to establish a new communication session or to join the active communication session "A".

Naturally, the labels to be associated with the two options are presented here as an example only. Any other set of suitable labels can be used, such as, but not limited to, "OPTION 1"/"OPTION 2", "EXISTING"/"NEW", "JOIN"/"CALL OUT", etc.

Step 550

Next, at step 550, the network element 112 receives from the communication client 108b the indication of whether the user 101a wishes to join the active communication session "A" or to establish the new communication session (i.e. a disposition instruction). How the user 101a provides the indication of whether the user 101a wishes to join the active communication session "A" or to establish the new communication session is not limited.

In a first non-limiting scenario, the user 101a may provide the indication of whether the user 101a wishes to join the active communication session "A" or to establish the new communication session by selecting one of the soft keys presented by the communication client 108b (ex. the "JOIN"/"NEW SESSION" soft keys). In a second non-limiting scenario, the user 101a may provide the indication of whether the user 101a wishes to join the active communication session "A" or to establish the new communication session by providing a speech utterance indicative of whether the user 101*a* wishes to join the active communication session "A" or to establish the new communication session. In another non-limiting scenario, the user 101*a* may provide the indication that the user 101*a* wishes to join the active communication session "A" by providing a first pre-determined sequence of digits. Within these non-limiting embodiments, the user 101*a* may provide the indication that the user 101*a* wishes to establish the new communication session by providing a second pre-determined sequence of digits. In another non-limiting scenario, the user 101*a* may provide the indication of whether the user 101*a* wishes to join the active communication session "A" or to establish the new communication session by clicking on a hyper-link, an icon and the like. If no indication is received after a pre-determined period of time, the network element could, for example, default to a particular choice.

It is contemplated that the user 101*a* may even provide the indication of whether the user 101*a* wishes to join the active communication session "A" or to establish the new communication session by means other than those presented by the communication client 108*b*. For example, the user 101*a* may employ another communication client, a wireless communication device, a computing apparatus and the like to provide the indication of whether the user 101*a* wishes to join the active communication session "A" or to establish the new communication session. In these embodiments of the present invention, as part of providing the indication, the user 101*a* also indicates which communication client (ex. one of the communication clients 108*b*, 108*c*), the user 101*a* wishes to use to join the active communication session "A" or to establish the new communication session.

Step 560

With reference to FIG. 5B, at step 560 the network element 112 examines the indication received as part of step 550 of FIG. 5A in order to determine whether the user 101*a* is desirous of joining the active communication session "A" of establishing the new communication session.

If the network element 112 determines that the user 101 wishes to establish the new communication session (i.e. the "NEW" branch of step 560), the network element 112 can provide standard call processing similar to the standard call processing provided as part of step 530. For example, the network element 112 may cause the communication client 108*b* to emit a dial tone.

Step 580

If, on the other hand, the network element 112 determines that the user 101*a* wishes to join the active communication session "A" (i.e. the "Active Communication Session "A"" branch of step 560), the network element 112 causes the communication client 108*b* to join the active communication session "A" at step 580. Step 580 can be implemented in substantially the same manner as step 430 of the method of FIG. 4.

An Optional Enhancement

Figure 6:
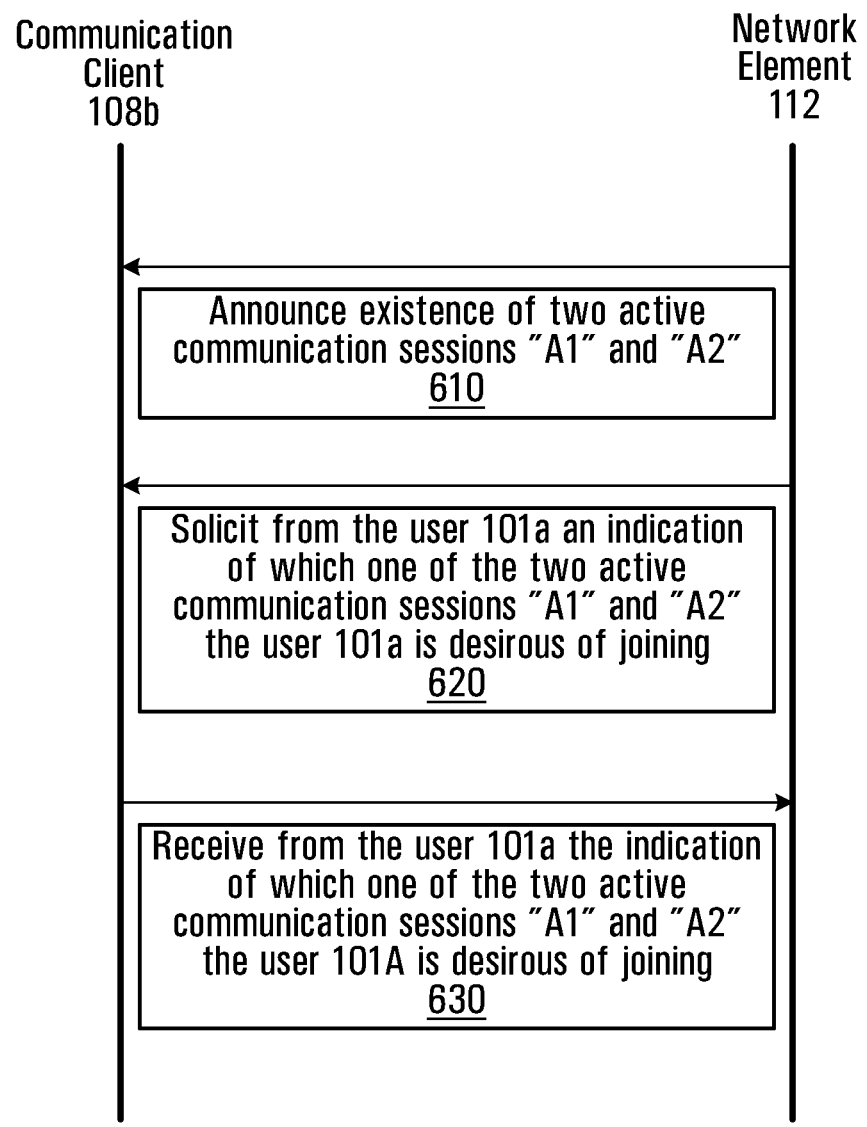
FIG. 6 is a flow chart representing a non-limiting embodiment of an optional enhancement that can be used with the methods of FIG. 4 and FIGS. 5A and 5B.

With reference to FIG. 6, an optional enhancement according to a non-limiting embodiment of the present invention will now be described. It should be understood that the optional enhancement can be performed as part of the method of FIG. 4 or as part of the method of FIGS. 5A/5B. For illustration purposes only, it will be assumed that this optional enhancement is executed as part of the method of FIG. 4.

In these non-limiting embodiments of the present invention, it is envisioned that the network element 112 may determine that more than one active communication session "A" exist. This is, for example, possible in a non-limiting scenario where the communication client 108*a* and the communication client 108*c* are engaged in respective active communication sessions "A1" and "A2".

The network element 112 may inform the user 101*a* that two active communication sessions "A1" and "A2" exist. This is depicted in FIG. 6 as step 610 where the network element 112 announces to the user 101*a* of the communication client 108*b* that two active communication sessions "A1" and "A2" exist. For example, the network element 112 can present an audio message, a text message or a combined audio/text message announcing to the user 101*a* that two active communication sessions "A1" and "A2" exist. In an alternative non-limiting embodiment of the present invention, the audio, text or combination message may be presented to the user 101*a* via another suitable means (such as, for example, via a cell phone, via an instant messaging application, a pop-up window in a computing apparatus and the like). In a non-limiting embodiment of the present invention, the network element 112 may identify the active communication session "A1" and the active communication session "A2" by the respective sub-addresses 206 of the corresponding communication clients 108*a*, 108*c* that are the endpoints of the communication sessions "A1" and "A2" respectively.

In alternative non-limiting embodiments of the present invention, the network element 112 may maintain an indication of an auxiliary identifier of each of the communication clients 108*a*, 108*b* and 108*c*, the auxiliary identifier being more amenable to being remembered and understood by the user 101*a* than the sub-addresses 206. Some examples of the auxiliary identifiers include, but are not limited to, "Line 1"/"Line 2"/"Line 3", "Bob"/"Mary"/"Jonathan", "Bedroom 1"/"Kitchen"/"Living Room". Naturally, other types of the auxiliary identifiers are possible. The indication of the auxiliary identifier may be stored in the aforementioned client mapping 200 and be provisioned during the aforementioned registration process or at another time for each or some of the communication clients 108*a*, 108*b* and 108*c*. In these non-limiting embodiments of the present invention, the network element 112 may identify the active communication sessions "A1", "A2" by presenting to the user 101*a* the respective auxiliary identifier of the corresponding communication client 108*a*, 108*c* that are the endpoints of the active communication sessions "A1" and "A2" respectively. In an alternative non-limiting embodiment of the present invention, the active communication sessions "A1" and "A2" may be identifier by CLID information (such as a number, a name or a combination thereof) of another party to the communication sessions "A1" and "A2" (i.e. the party other than the one within the customer premises 102).

The network element 112 may further solicit an indication from the user 101*a* of the communication client 108*b* which one the communication sessions "A1" and "A2" the user 101*a* is desirous of joining, which has been depicted in FIG. 6 as step 620. In an alternative non-limiting embodiment of the present invention, steps 610 and 620 can be executed in a single step or, in other words, the network element 112 may inform the user 101*a* of the existence of the two active communication sessions "A1" and "A2" and solicit from the user 101*a* an indication which one of the two active communication sessions "A1" and "A2" the user 101*a* wishes to join as part of the same step.

Next, at step 630, the network element 112 receives from the user 101*a* the indication of which of the two active communication sessions "A1" and "A2" the user 101*a* is desirous of joining. In some non-limiting embodiments of the present invention, the user 101a may provide the indication of which of the two active communication sessions "A1" and "A2" the user 101a is desirous of joining by, for example, producing a spoken utterance indicative of which of the two active communication sessions "A1" and "A2" the user 101a is desirous of joining, by keying in a predetermined sequence of keys indicative of which of the two active communication sessions "A1" and "A2" the user 101a is desirous of joining, by clicking a pre-determined key, link or button indicative of which of the two active communication sessions "A1" and "A2" the user 101a is desirous of joining. Naturally, the indication of which of the two active communication sessions "A1" and "A2" the user 101a is desirous of joining allowance may be provided by other means which will become apparent to those of skill in the art.

Even though the foregoing description has been provided with an example of the active communication session "A" comprising a voice communication session (i.e. a VoIP call), one skilled in the art will readily appreciate that the type of the active communication session "A" is not particularly limited and may include, but is not limited to, a video communication session, a text messaging communication session, an instant messaging communication session, and many other possibilities. It should be further understood that teachings of this invention are not limited to the VoIP protocol and one skilled in the art can easily adapt the teachings presented herein to other protocols for handling media-over-a-network communications.

Accordingly, by executing the above-described method and conceivable variants thereof, the network element 112 may offer the user 101a an experience similar to the experience the user 101a may have enjoyed in a PSTN-based communication system. At the same time, the network element 112 may deliver features that have not been hereforthto delivered within the PSTN or VoIP-based communication systems.

Those skilled in the art will appreciate that certain functionality of the network element 112 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the network element 112 and/or other elements may be implemented as an arithmetic and logic unit (ALU) having access to a code memory (not shown) which stores program instructions for the operation of the ALU. The program instructions could be stored on a medium which is fixed, tangible and readable directly by the network element 112 and/or other elements, (e.g., removable diskette, CD-ROM, ROM, fixed disk, USB drive), or the program instructions could be stored remotely but transmittable to the network element 112 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method implemented by a network element connectable to at least one communication client having a particular network identifier via a communication network, the method comprising:
   receiving from a particular communication client having a particular network identifier a Session Initiation Protocol (SIP) message indicative of an off-hook state of the particular communication client, the particular network identifier of the communication client from which the SIP message is received is one of a plurality of network identifiers registered in association with a particular SIP Uniform Resource Indicator (URI);
   accessing a database, said database associating a plurality of SIP URIs with a plurality of network identifiers, including the particular SIP URI and the plurality of associated network identifiers;
   retrieving from said database a second network identifier associated with a second communication client, the second network identifier being one of the plurality of network identifiers registered in association with the particular SIP URI;
   determining, at the network element, if there is at least one active communication session in progress with the second network identifier; and
   responsive to determining that there does exist at least one active communication session, causing the particular communication client to join the active communication session.

2. The method defined in claim 1, wherein said receiving an indication from a communication client comprises receiving a communication session request from the particular communication client.

3. The method defined in claim 1, wherein said received SIP message is transmitted in response to detection of at least one of:
   a user of the particular communication client selecting a soft key;
   the user of the particular communication client clicking on a button;
   the user of the particular communication client dialling a pre-determined sequence of keys;
   the user of the particular communication client producing a speech utterance.

4. The method defined in claim 1, wherein said determining if there is at least one active communication session in progress comprises accessing an active call table.

5. The method defined in claim 1, wherein said causing the particular communication client to join at least one of said at least one active communication session comprises formulating a signalling message destined for the particular network identifier and releasing said signalling message to the particular network identifier; said signalling message for causing the particular communication client associated with the network identifier to join said at least one of said at least one active communication session.

6. The method defined in claim 5, wherein said signalling message comprises a SIP INVITE message.

7. The method defined in claim 1, said at least one active communication session having been established between said at least one other communication client and a second communication party, wherein said causing the particular communication client to join at least one of said at least one active communication session comprises establishing a multi-party call between the particular communication client associated with the particular SIP URI said at least one other communication client associated with the particular SIP URI and said second communication party.

8. The method defined in claim 1, said at least one communication session having been established between said at least one other communication client and a second communication party, wherein said causing the particular communication client to join at least one of said at least one active communication session comprises establishing a communication session with the particular communication client associated with the particular SIP URI and bridging said communication session with said at least one active communication session.

9. The method defined in claim 1, wherein said determining if there exists at least one active communication session comprises establishing that (i) a first active communication session is in progress with a first other communication client registered in association with the SIP URI and (ii) a second active communication session is in progress with a second other communication client registered in association with the SIP URI; and wherein the method further comprises:
    soliciting from the particular communication client an indication of which one of said first and second active communication sessions the particular communication client is desirous of joining.

10. The method defined in claim 9, further comprising receiving from the particular communication client said indication of which one of said first and second active communication sessions the particular communication client is desirous of joining; and wherein said causing the particular communication client to join said at least one of said at least one communication session comprises:
    causing the particular communication client to join one of said first and second active communication sessions in accordance with said indication of which one of said first and second active communication sessions the particular communication client is desirous of joining.

11. A system comprising:
    a network element connectable to at least one communication client having a particular network identifier via a communication network, said network element comprising a computing apparatus for executing computer-readable instructions stored on a non-transitory computer-readable medium and operable:
        to receive from said at last one communication client a Session Initiation Protocol (SIP) message indicative of an off-hook state of the particular communication client, the particular network identifier of the communication client from which the SIP message is received is one of a plurality of network identifiers registered in association with a particular SIP Uniform Resource Indicator (URI);
        to access a database, said database associating a plurality of SIP URIs with a plurality of network identifiers, including the particular SIP URI and the plurality of associated network identifiers;
        to retrieve from said database a second network identifier associated with a second communication client, the second network identifier being one of the plurality of network identifiers registered in association with the particular SIP URI;
        to determine if there is at least one active communication session in progress with the second network identifier;
        responsive to a positive determination that there does exist at least one active communication session, causing the particular communication client to join the active communication session.

12. The system defined in claim 11, wherein the system further comprises said at least one communication client; and wherein said at least one communication client is operable to generate said SIP message.

13. The system defined in claim 12, wherein said at least one communication client is operable to automatically generate said SIP message upon entering into the off-hook state.

14. The system defined in claim 12, wherein said at least one communication client is operable to generate said SIP message upon detection of at least one of:
    a user of said at least one communication client selecting a soft key; the user of said at least one communication client clicking on a button;
    the user of said at least one communication client dialling a pre-determined sequence of keys;
    the user of said at least one communication client producing a speech utterance.

15. The system defined in claim 11, wherein to determine if there is at least one active communication session in progress, said network element is operable to access an active call table.

16. The system defined in claim 15, wherein said network element comprises said active call table.

17. The system defined in claim 15, further comprising said active call table, wherein said active call table is accessible and is under control of said network element.

18. The system defined in claim 11, wherein to cause said at least one communication client to join at least one of said at least one active communication session, said network element is operable to formulate a signalling message destined for said at least one communication client and to release said signalling message to said at least one communication client; said signalling message for causing said at least one communication client to join said at least one of said at least one active communication session.

19. The system defined in claim 18, wherein said signalling message comprises a SIP INVITE message.

20. The system defined in claim 11, said at least one active communication session having been established between said at least one other communication client and a second communication party, wherein to cause said at least one communication client to join at least one of said at least one active communication session, said network element is operable to establish a multi-party call between said at least one communication client associated with the particular SIP URI, said at least one other communication client associated with the particular SIP URI and said second communication party.

21. The system defined in claim 11, said at least one communication session having been established between said at least one other communication client and a second communication party, wherein to cause said at least one communication client to join at least one of said at least one active communication session, said network element is operable to establish a communication session with said at least one communication client associated with the particular SIP URI and to bridge said communication session with said at least one active communication session.

22. The system defined in claim 11, wherein if said network element determines that (i) a first active communication session is in progress with a first other communication client registered in association with the SIP URI and (ii) a second active communication session is in progress with a second other communication client registered in association with the SIP URI; said network element is further operable to:
    solicit from said at least one communication client an indication of which one of said first and second active communication sessions said at least one communication client is desirous of joining.

23. The system defined in claim 22, wherein said network element is further operable to receive from said at least one communication client said indication of which one of said first and second active communication sessions said at least one communication client is desirous of joining; and wherein to cause said at least one communication client to join said at least one of said at least one communication session, said network element is operable to:

cause said at least one communication client to join one of said first and second active communication sessions in accordance with said indication of which one of said first and second active communication sessions said at least one communication client is desirous of joining.

24. The system defined in claim 11, wherein said network element is embodied in a soft switch.

25. A non-transitory computer-readable medium comprising computer-readable program code which, when executed by a computing apparatus, causes the computing apparatus:

to receive from said at last one communication client a Session Initiation Protocol (SIP) message indicative of an off-hook state of the particular communication client, the particular network identifier of the communication client from which the SIP message is received is one of a plurality of network identifiers registered in association with a particular SIP Uniform Resource Indicator (URI);

to access a database, said database associating a plurality of SIP URIs with a plurality of network identifiers, including the particular SIP URI and the plurality of associated network identifiers;

to retrieve from said database a second network identifier associated with a second communication client, the second network identifier being one of the plurality of network identifiers registered in association with the particular SIP URI, to determine if there is at least one active communication session in progress with the second network identifier;

responsive to a positive determination that there does exist at least one active communication session, causing the particular communication client to join the active communication session.

* * * * *